(12) United States Patent
Angier et al.

(10) Patent No.: US 7,041,266 B1
(45) Date of Patent: May 9, 2006

(54) SILICON CARBIDE FIBERS ESSENTIALLY DEVOID OF WHISKERS AND PRODUCTS MADE THEREFROM

(75) Inventors: Derek J. Angier, Simpsonville, SC (US); James F. Rhodes, Greer, SC (US); William M. Rogers, Taylors, SC (US)

(73) Assignee: Advanced Composite Materials Corp., Greer, SC (US)

( * ) Notice: Subject to any disclaimer, the term of this patent is extended or adjusted under 35 U.S.C. 154(b) by 0 days.

(21) Appl. No.: 11/186,941

(22) Filed: Jul. 22, 2005

Related U.S. Application Data

(63) Continuation-in-part of application No. 10/191,973, filed on Jul. 10, 2002.

(51) Int. Cl.
*C01B 31/36* (2006.01)

(52) U.S. Cl. .................... 423/345; 423/346; 501/88; 501/95.1; 428/221; 442/362

(58) Field of Classification Search ........... 423/345, 423/346; 501/88, 95.1; 428/221; 442/362
See application file for complete search history.

(56) References Cited

U.S. PATENT DOCUMENTS

| | | |
|---|---|---|
| 3,269,802 A | 8/1966 | Wainer et al. |
| 3,403,008 A | 9/1968 | Hamling |
| 3,640,693 A | 2/1972 | Galasso et al. |
| 3,754,076 A | 8/1973 | Cutler |
| 3,773,899 A | 11/1973 | Lewis |
| 4,100,233 A | 7/1978 | Yajima et al. |
| 4,127,659 A | 11/1978 | DeBolt et al. |
| 4,283,375 A | 8/1981 | Horne, Jr. et al. |
| 4,284,612 A | 8/1981 | Horne, Jr. et al. |
| 4,481,179 A | 11/1984 | Wei |
| 4,485,179 A | 11/1984 | Brennan et al. |
| 4,492,681 A | 1/1985 | Endou et al. |
| 4,663,105 A | 5/1987 | Sakai et al. |
| 4,849,196 A | 7/1989 | Yamada et al. |
| 4,855,122 A | 8/1989 | Kitamura et al. |
| 4,873,069 A | 10/1989 | Weaver et al. |
| 4,915,924 A | 4/1990 | Nadkarni et al. |
| 4,975,392 A | 12/1990 | Yamada et al. |
| 5,021,230 A | 6/1991 | Krstic |
| 5,039,501 A | 8/1991 | Kibbel et al. |
| 5,071,600 A | 12/1991 | Deleeuw et al. |
| 5,087,272 A | 2/1992 | Nixdorf |
| 5,230,848 A | 7/1993 | Wallace et al. |
| 5,268,336 A | 12/1993 | Deleeuw et al. |
| 5,279,780 A | 1/1994 | Lipowitz et al. |
| 5,340,417 A | 8/1994 | Weimer et al. |
| 5,344,709 A | 9/1994 | Tokutomi et al. |
| 5,618,510 A | 4/1997 | Okada et al. |
| 5,643,514 A | 7/1997 | Chwastiak et al. |
| 5,651,250 A | 7/1997 | Kawamura |
| 5,676,918 A | 10/1997 | Okada et al. |
| 5,682,740 A | 11/1997 | Kawamura |
| 5,698,143 A | 12/1997 | Tani et al. |
| 5,720,933 A | 2/1998 | Srinivasan |
| 5,809,777 A | 9/1998 | Kawamura |
| 5,906,799 A * | 5/1999 | Burgie et al. ............... 422/241 |
| 5,922,300 A | 7/1999 | Nakajima et al. |
| 5,928,978 A | 7/1999 | Barnard et al. |
| 5,945,362 A | 8/1999 | Ishikawa et al. |
| 6,022,515 A | 2/2000 | Stole et al. |
| 6,203,904 B1 * | 3/2001 | Sacks ......................... 428/368 |
| 6,316,051 B1 | 11/2001 | Okada |
| 6,689,191 B1 | 2/2004 | Dunmean et al. |
| 6,767,523 B1 | 7/2004 | Nixdorf |
| 6,841,273 B1 * | 1/2005 | Horiuchi et al. ............ 428/698 |
| 2001/0008651 A1 * | 7/2001 | Okada ........................ 427/214 |
| 2002/0069756 A1 | 6/2002 | Mako et al. |
| 2003/0017096 A1 | 1/2003 | Nixdorf |

FOREIGN PATENT DOCUMENTS

| | | |
|---|---|---|
| CN | 1374416 A | 10/2002 |
| EP | 77-1773 A | 5/1997 |
| FR | 2497434 A | 7/1982 |
| GB | 998089 | 7/1965 |
| GB | 2 147 891 A | 5/1985 |
| JP | 56-145180 | 11/1981 |
| JP | 57-209813 | 12/1982 |
| JP | 58-20799 | 2/1983 |
| JP | 60-46908 | 3/1985 |
| JP | 61-17499 | 1/1986 |
| JP | 63-100055 A | 5/1988 |
| JP | 70-19476 A | 1/1995 |
| JP | 70-42533 A | 2/1995 |
| JP | 71-27434 A | 5/1995 |
| JP | 72-15777 A | 8/1995 |
| JP | 72-91756 A | 11/1995 |
| JP | 81-88926 A | 7/1996 |
| JP | 11061573 A | 3/1999 |

OTHER PUBLICATIONS

"Preparation of Silicon Carbide Fiber From Activate Carbon Fiber and Gaseous Silicon Monoxide", K. Okada, et al., Ceramic Engineering & Science Proceedings, Jul.-Aug. 1994, pp. 45-54.

A. Idesaki, et al, "Synthesis of SiC-Based Fibers Derived From Hybrid Polymer of Polycarbosilane and Polyvinylsilane", Key Engineering Materials vols. 159-160 (1999), pp. 107-112.

* cited by examiner

Primary Examiner—Ngoc-Yen Nguyen
(74) Attorney, Agent, or Firm—Banner & Witcoff, Ltd.

(57) ABSTRACT

Silicon carbide fibers are produced by mixing discontinuous isotropic carbon fibers with a silica source and exposing the mixture to a temperature of from about 1450° C. to about 1800° C. The silicon carbide fibers are essentially devoid of whiskers have excellent resistance to oxidation and excellent response to microwave energy, and can readily be formed into a ceramic medium employing conventional ceramic technology. The fibers also may be used for plastic and metal reinforcement.

21 Claims, 17 Drawing Sheets

14-A
PRIOR ART

14-B
PRIOR ART

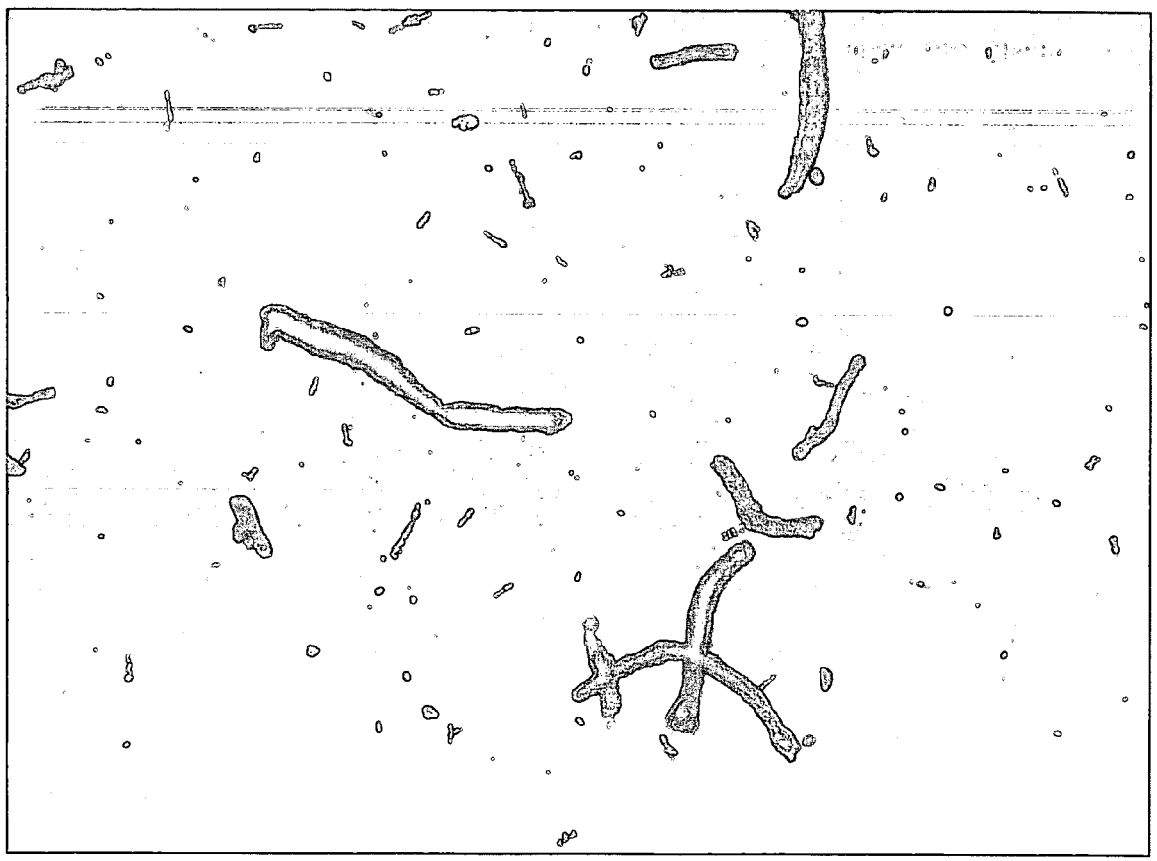
14-C
PRIOR ART

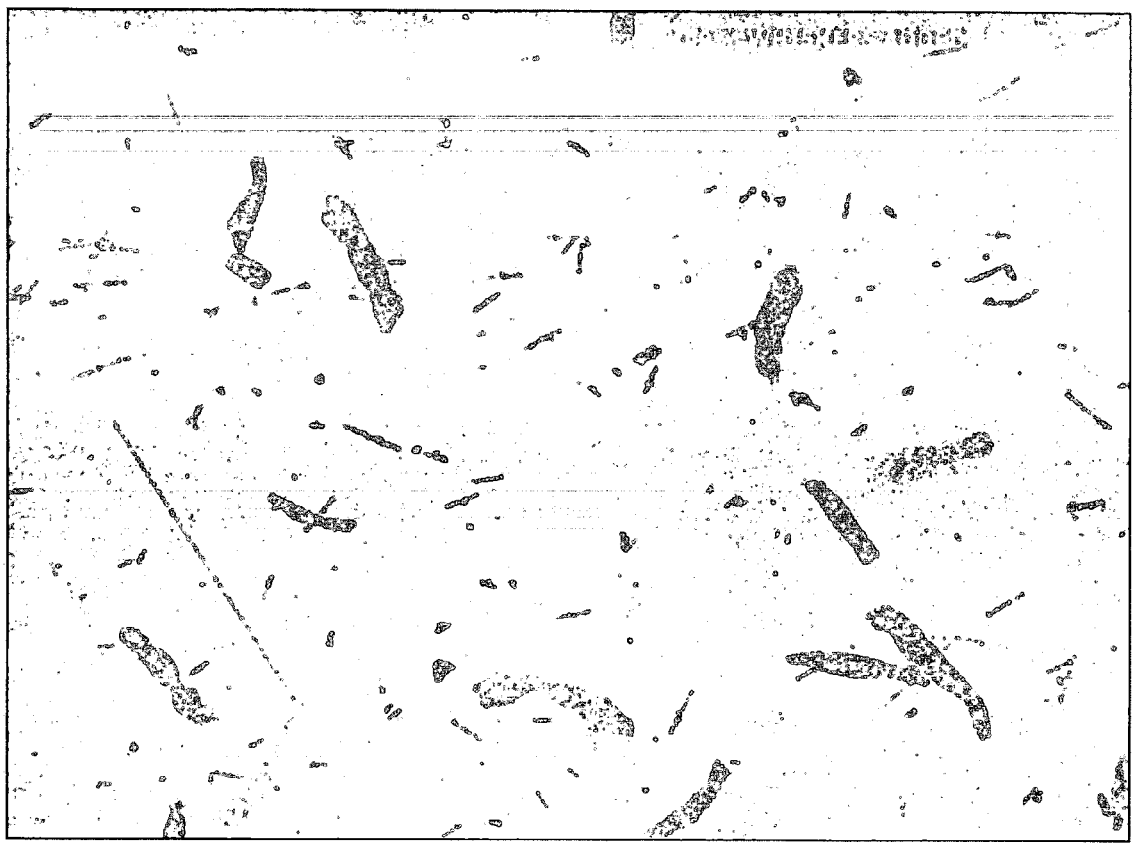
14-D
PRIOR ART

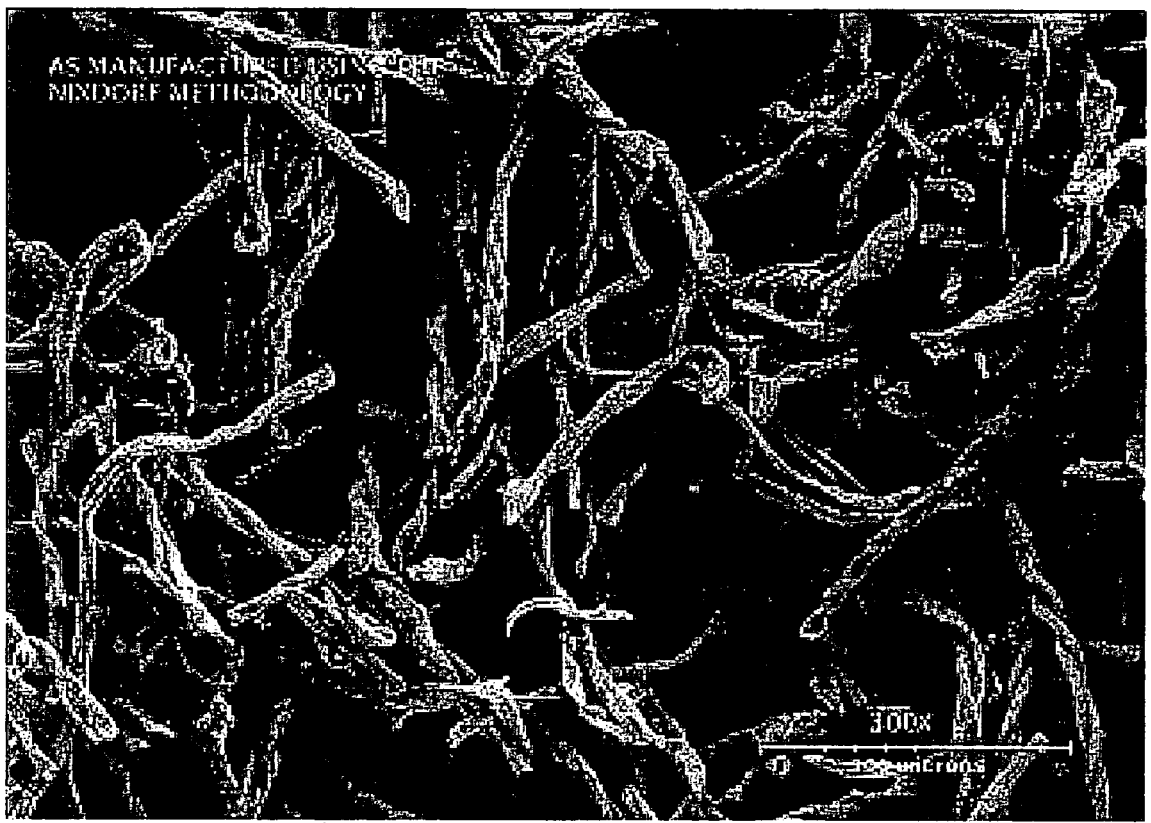
15-A
PRIOR ART

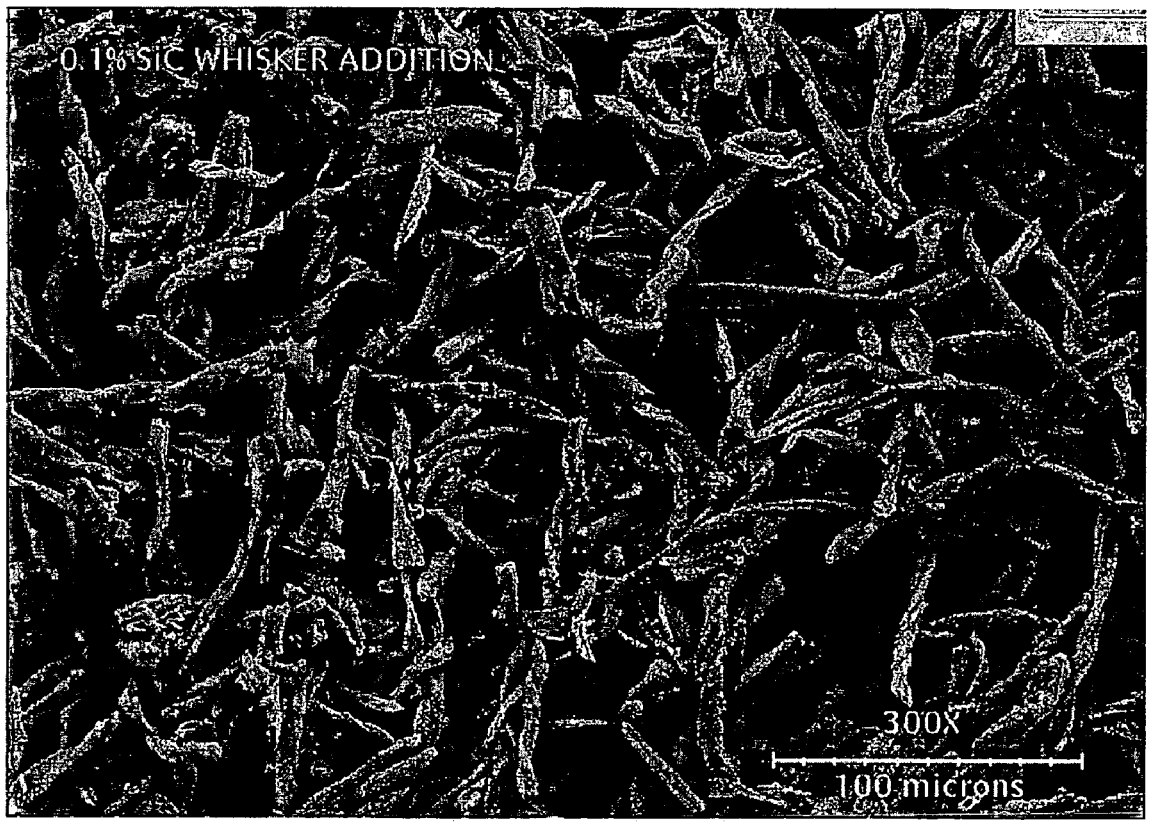
15-B
PRIOR ART

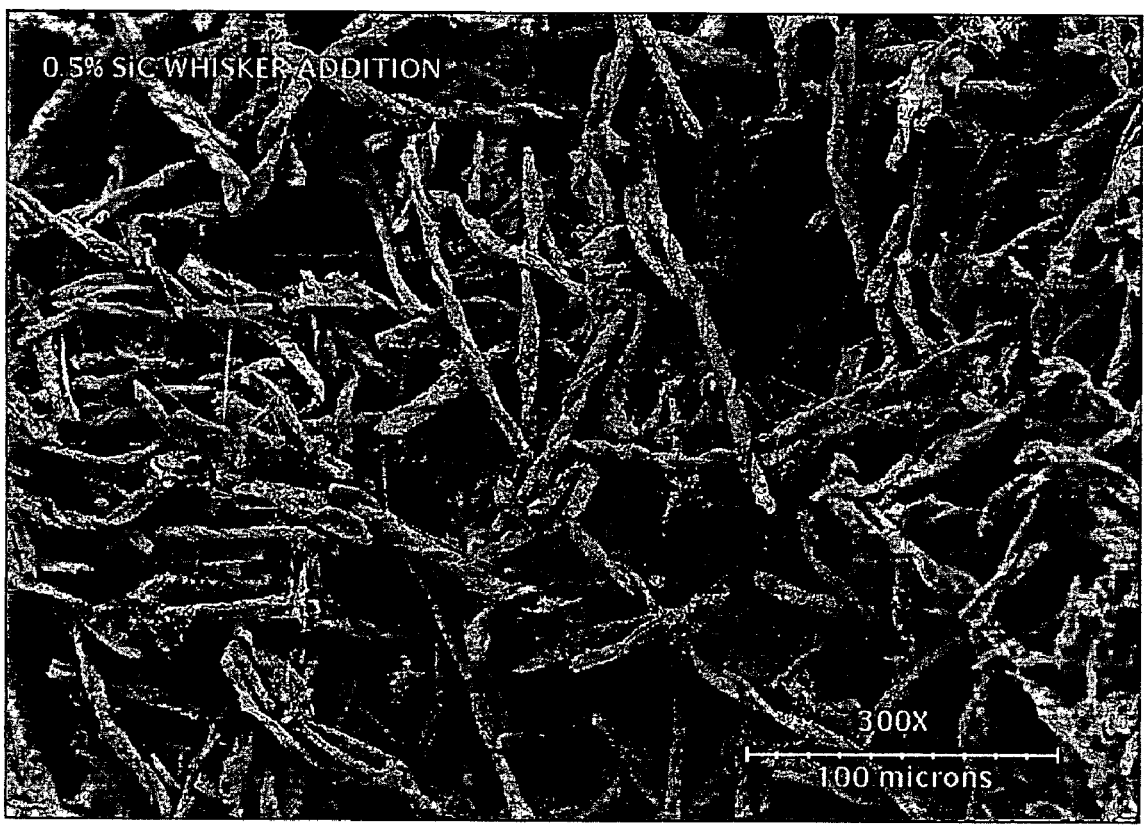
15-C
PRIOR ART

15-D
PRIOR ART

SILICON CARBIDE FIBERS ESSENTIALLY DEVOID OF WHISKERS AND PRODUCTS MADE THEREFROM

This application is a Continuation-in-Part of application Ser. No. 10/191,973 filed Jul. 10, 2002, which is incorporated herein by reference.

BACKGROUND OF THE INVENTION

1. Field of Invention

The present invention is directed to discontinuous silicon carbide fibers and products made therefrom. In particular, the invention is directed to dense discontinuous silicon carbide fibers that retain the morphology of the carbon source, are essentially devoid of boron, respond to microwave energy, and are essentially devoid of whiskers.

2. Description of the Related Art

Silicon carbide is used as reinforcement for both ceramics and plastics subjected to high temperatures. Silicon carbide materials have many desirable qualities including high resistance to oxidation, excellent mechanical strength, and the ability to withstand multiple exposures to high temperatures without deformation. The importance of such qualities has led to the development of many methods by which various shapes of silicon carbide materials are made. The different shapes are useful in a plethora of industrially important products.

Silicon carbide is commonly available in particulate, whisker, fiber, and cloth forms. Each form has distinct properties and characteristics exploitable in divers industrial applications.

Various methods have been developed to produce silicon carbide having these forms. For example, Evans, GB 998,089, describes a method for making silicon carbide cloth. First, carbon cloth is heated in an inert atmosphere, then embedded in fine powdered silicon (99.9 percent purity). The silicon-embedded cloth is then heated in an inert atmosphere to 1410° C., i.e., just below the melting point of silicon, to produce a cloth of silicon carbide.

Methods for making silicon carbide whiskers, i.e., elongated single crystals of silicon carbide, are well-known. Liquid- and gas-phase reaction systems are often used to form these elongated single crystals. Typical methods of making silicon carbide whiskers include: (1) solidification from liquid silicon carbide at high temperature and high pressure, (2) dissolving carbon into molten silicon and crystallizing the silicon carbide, (3) sublimation of silicon carbide powder and subsequent re-deposition, and (4) deposition of silicon carbide crystals from the vapor of silicon compounds.

For example, Wainer, U.S. Pat. No. 3,269,802 is directed to preparation of metal carbide products by exposing a carbonized product to an atmosphere comprising volatilizable metal-containing material, such as a metal halide or a metal carbonyl. The product takes the general form of the carbonized material, but also appears in other forms, including whiskers, fibers, and coatings. Thus, the method does not form a single product and produces environmentally undesirable waste gas.

Another method for producing metal carbide shapes is set forth in Hamling, U.S. Pat. No. 3,403,008. Organic material in the desired shape is impregnated with a metal compound solution. The impregnated form then is heated in two steps: first, to carbonize the organic material, then to form the metal carbide.

Cutler, U.S. Pat. No. 3,754,076, is directed to a method for producing silicon carbide whiskers from rice hulls, which comprise about 15–20 percent silica and carbon. A metal-containing composition, typically metal oxide, is used to catalyze the reaction. Iron and iron oxide are suitable catalysts.

Yamada, U.S. Pat. No. 4,849,196, is directed to a process for producing silicon carbide whiskers. In Yamada's method, Fe, Co, or Ni are added in any combination to minimize the production of silicon carbide powder while maximizing the yield of silicon carbide whiskers.

Weaver, U.S. Pat. No. 4,873,069, discloses a process for production of silicon carbide whiskers. In accordance with Weaver's process, discontinuous fluffy carbonized fibers (having a void volume of at least 40 percent) and ultra fine silica are heated to 1600–1900° C. for about 2 hours to produce silicon carbide whiskers. Boron oxide, alone or mixed with aluminum, serves as a catalyst. A preferred carbon source is carbonized cotton fiber having a diameter of 4–15 μm and an average length of about 2 mm. The whiskers have a smooth surface, a diameter of 0.5 to 10 μm and a length of up to 1 mm. Nixdorf, U.S. Pat. No. 5,087,272, uses the process described in Weaver to generate silicon carbide whiskers having a diameter of 1–3 microns which are then incorporated into ceramic filters for removing volatile organic compounds from gas streams.

Other methods for producing silicon carbide whiskers include use of iron to catalyze the formation of whiskers from rice hulls (Home, U.S. Pat. No. 4,283,375). Similarly, Horne, U.S. Pat. No. 4,284,612, is directed to use of iron to catalyze production of silicon carbide whiskers from the combination of ground carbonized organic fibers, silica, and rice hulls.

Silicon carbide whiskers are not satisfactory for all purposes. Whiskers are very small. Therefore, whiskers are not satisfactory for applications in which relatively long fibers are preferred. For example, whiskers often are so small as to be difficult to incorporate into a fibrous web.

Whiskers also present an environmental problem. Airborne whiskers could present a health hazard. For example, the production of respirable particles from silicon carbide whisker handling, from devices containing whiskers, and in particular from filtering devices that are repeatedly exposed to high temperatures, are sources of concern. As can be seen from the methods described herein, whiskers are relatively expensive and technically difficult to make. Proper handling of whiskers is especially important so as to minimize the number of inhalable fine particles. As can be seen, therefore, when whiskers are not the desired product, it is important to avoid production of whiskers as a by-product.

Silicon carbide fiber and filament forms avoid some of the failings of silicon carbide whiskers. Woven and composited forms of silicon carbide materials may also avoid some of the problems presented by whiskers. Fiber, filament, and woven forms comprise particles larger than whiskers, and are therefore, less likely to yield airborne respirable particles. However, the prior art does not include a suitable method to produce such products essentially without whiskers.

Wei, U.S. Pat. No. 4,481,179, is directed to a method of producing silicon carbide bonded fiber composites, starting from a carbon-bonded carbon fiber composite. Galasso, U.S. Pat. No. 3,640,693, is directed to forming a silicon-containing fiber by casting silicon metal in a glass tube, drawing composite filaments, removing the glass sheath, then exposing the silicon metal to carbon or nitrogen to produce silicon carbide or silicon nitride, respectively. Debolt, U.S. Pat. No.

4,127,659, is directed to coating a refractory substance, such as carbon, with silicon carbide by chemical vapor deposition to produce a silicon carbide filament containing a core and a coating of carbon-rich silicon carbide. Srinivasan, U.S. Pat. No. 5,729,033, is directed to a method of producing silicon carbide material (fiber, fabric, or yarn) by carbothermal reduction of silicon material. Particular proportions of silica and carbon are preferred.

DeLeeuw, U.S. Pat. No. 5,071,600 and U.S. Pat. No. 5,268,336, are directed to methods for producing silicon carbide fibers by the reaction of polycarbosilane and methylpolydisilylazane resins in the presence of boron. Tokutomi, U.S. Pat. No. 5,344,709, describes a silicon carbide fiber produced from polycarbosilane fiber and having an amorphous layer of carbon thereon. Yajima, U.S. Pat. No. 4,100,233, describes a method of producing continuous silicon carbide fibers which involves dissolving or melting an organosilicon compound in a solvent and spinning the solution into filaments. The spun filaments are then heated to volatilize low molecular weight compounds, and, finally, baked to form silicon carbide fibers.

SYNTHESIS OF SiC-BASED FIBERS DERIVED FROM HYBRID POLYMER OF POLYCARBOSILANE AND POLYVINYLSILANE, Proceedings of the International Symposium on Novel Synthesis and Processing of Ceramics, 107–112 (1997), A. Idesaki, M. Narisawa, K. Okamura, M. Sugimoto, T. Seguchi, and M. Itoh, discloses a fiber comprising oxygen, silicon, and carbon. Polycarbosilane or a mixed polycarbosilane/polymethylsilane solution was partially crosslinked by heating, then melt-spun. The melt-spun material then is cured by heating in air at least to 1,000° C. to carbonize the material. The resultant product is identified as silicon carbide fiber. However, this is a misnomer because the product comprises between about 6 and 13 wt percent oxygen. The presence of oxygen in the backbone of this so-called silicon carbide fiber renders it unsuitable, especially in a moist environment.

Each of these methods has disadvantages. The continuous silicon carbide filaments produced by the chemical vapor deposition method are not homogenous and, when chopped to obtain fibers, a carbon core is exposed. The resultant fiber product has reduced resistance to oxidation. All of the polymer conversion methods are disadvantageous in that they require synthesis of the starting material which must then be spun, cured, and pyrrolized to burn off the organic material. The submicron silicon carbide powder process incorporated by reference in Srinivasan is expensive and difficult to implement because the polymer carrier requires further processing to effectuate its removal.

Okada, U.S. Pat. No. 5,618,510, discloses a method for producing silicon carbide fiber, sheets, and three-dimensional articles having a silicon nitride coating. Carbon fiber is activated in a known manner. The porous activated carbon material having a specific surface area of 100 to 2500 $m^2/g$ is treated with silicon monoxide gas at a temperature of 800 to 2000° C. Pressure during silicidation must be 10 Pa or less to fully convert the carbon and prevent formation of whiskers. The resulting silicon carbide fiber material then is heat treated in nitrogen in the absence of oxygen to reduce porosity of the surface and to coat the material with silicon nitrides. The product has an oxygen content of 1.0 wt percent and a nitrogen content of 2.0 wt percent.

PREPARATION OF SILICON CARBIDE FIBER FROM ACTIVATED CARBON FIBER AND GASEOUS SILICON MONOXIDE, Okada, K., H. Kato, R. Kubo, and K. Nakajima Ceramic Engineering and Science Proceedings 16(4): 45–54, 1995, discloses manufacture of silicon carbide fiber from activated carbon fiber having specific surface area of 500 to 2500 $m^2/g$, and exemplified use of carbon fiber having a diameter of 10 microns and a specific surface area of 960 $m^2/g$. The carbon fiber is reacted with silicon monoxide at 10 Pa pressure. The resultant silicon carbide fiber was treated in oxygen at 800° C. to combust materials other than silicon carbide. The resultant silicon carbide fiber shows a granular structure not present in the activated carbon fiber. The specific surface area was reduced from 960 to 50 $m^2/g$ due to growth in pore size. Although photomicrographs indicate that granularity was reduced, the density appears to have remained the same, as the dimensions of the fibers appear to remain unchanged. The particles are described as more dense after treatment with nitrogen at 1600° C. Although silicon nitride was not found by x-ray diffraction, the nitrogen content of the particles was 2.0 wt percent. The nitrogen content is found in the 3 micron surface layer, thus essentially permeating the 10 micron fiber, or approximately 85 percent by weight.

Okada, U.S. Pat. No. 5,676,918, discloses a method for producing silicon carbide fiber having a high tensile strength and a uniform structure without whiskers. Activated, porous carbon fiber having a specific surface area of 100 to 3000 $m^2/g$ and length at least 5 mm are reacted with silicon monoxide at 800–2000° C. at a pressure no more than 100 Pa. The fibers must be held in tension to produce the desired result. The low pressure is required to reduce whisker formation. The silicon carbide fiber has the same form as the carbon fiber, and the dimensions of the silicon carbide fiber and the carbon fiber are essentially unchanged. Silicon carbide fiber produced from unactivated, non-porous carbon fiber having specific surface areas lower than 100 $m^2/g$ remained unreacted at the core.

Nakajima, U.S. Pat. No. 5,922,300, discloses a method for converting porous carbon filaments, yarns, and woven and non-woven fabrics having a specific surface area of 300 to 2000 $m^2/g$ to silicon carbide fiber. The carbon filaments are mixed with a silicon-containing powder, such as silicon or silicon dioxide, and heated to 1200 to 1500° C. The patent discloses that whisker-producing catalysts, such as iron, must not be present, and the pressure is 1000 Pa or less to prevent whisker formation. The resultant silicon carbide fiber product is separated from the remaining particles by sieving or washing. The resultant silicon carbide fiber product has essentially the same dimensions (length and diameter) as the carbon fiber, and thus has a relatively low density. Example 1 discloses that Renoves® A-10 is suitable as activated carbon fiber precursor. This material, commercially available from Osaka Gas K.K., has a specific surface area of 1100 $m^2/g$ and a pore volume of 0.54 $cm^3/g$. Therefore, the calculated apparent density, as that term is defined herein, of the exemplified product of Example 1 is 1.17 g/cc.

Okada, U.S. Pat. No. 6,316,051, discloses a method for manufacturing silicon carbide fiber, yarn, or fabric by reaction of activated carbon fiber having a specific surface area of 700 to 1500 $m^2/g$ with silicon or silicon monoxide powder at 1200–1500° C. under reduced pressure. The fibers then are treated with a boron-containing substance in an amount sufficient to provide at least 0.1 wt percent boron and heat-treated at a temperature of 1700–2300° C. Whisker production is minimized by removing volatiles from the activated carbon fiber. Silicon carbide fiber product has the same structure as the carbon fiber from which it was made, as does the product heat-treated without boron. However, the boron-containing, heat-treated product is said to have a higher density.

Nixdorf, U.S. Pat. No. 6,767,523, discloses a method for producing silicon carbide fiber having up to 1 wt percent whiskers. Carbonized cotton fibers and fumed silica powder are reacted in the presence of ferrous sulfate and calcium oxalate at about 1700° C. According to the patent, carbonized cotton fiber is the sole carbon source that will produce silicon carbide fiber having up to 1 wt percent whiskers, and no other carbonized organic fiber will work in this method. The resultant fibers retain the morphology of the carbon fiber, and so remain not very dense. The size of the silicon carbide fiber is limited by the length of the chopped carbon fiber derived from cotton. The length is short, about ⅛ to ½ inch.

Silicon carbide fiber products produced by these methods are not completely satisfactory. The resultant silicon carbide fiber is porous and not dense, is dense only at the surface, or is contaminated with densifying agents such as nitrogen, boron, or silicon nitride. Some products are limited in size by the limitations of the raw materials and include undesirable whiskers. Whiskers are air pollutants and must be controlled to minimize health problems, especially of those who handle them.

Thus, there remains a need for an easily implemented, economical, and environmentally benign method of producing homogenous, dense, discontinuous, silicon carbide fibers essentially devoid of whiskers.

SUMMARY OF THE INVENTION

The invention is directed to discontinuous silicon carbide fiber essentially devoid of whiskers, essentially devoid of boron, and having less than about 1.25 wt percent nitrogen, and an apparent density greater than about 1.65 g/cc, and to products made with the fibers. Skilled practitioners recognize that such fibers are not single crystals. The silicon carbide fibers of the present invention are produced at a high yield, are essentially devoid of whiskers, and are dense because they retain the morphology of the carbonized fiber if promoters are used. The silicon carbide fibers of the invention, and especially silica-coated fibers of the invention, can be readily incorporated into other media, such as ceramics, plastics, and metals, via conventional processing technology.

Because silicon carbide fiber of the invention is essentially devoid of whiskers, it is easier to handle in an environmentally responsible manner. The fibers of the invention are not coated with boron or silicon nitride, and have low oxygen and nitrogen concentrations. The silicon carbide fiber of the invention can be coated with silica. Silicon carbide fiber of the invention also can be produced in preselected lengths or ranges of lengths.

The silicon carbide fibers of the present invention are economically produced, as the reaction is carried out at atmospheric pressure. Silicon carbide fibers of the invention are exceptionally responsive to microwave energy, and have excellent resistance to oxidation during repeated exposures to microwave radiation. Thus, a ceramic medium having the fibers of the invention incorporated therein is especially suited for use as a regenerable filter medium in a device for removing combustible carbonaceous compounds from fluids such as diesel engine exhaust. Silicon carbide fiber of the invention also is adapted to form non-woven webs for various uses.

In accordance with the present invention, discontinuous silicon carbide fibers essentially devoid of whiskers are prepared by admixing discontinuous isotropic carbon fiber, silica, and preferably at least two promoters to form a fiber/silica mixture; drying the fiber/silica mixture; and reacting dried fiber/silica mixture in a resistance furnace for a time and at a temperature sufficient to form the discontinuous silicon carbide fibers of the invention essentially devoid of whiskers.

Thus, discontinuous silicon carbide fibers of the present invention are less expensive to produce, easier and less costly to process into substrate materials, such as ceramic filter media, and are produced by a method that is environmentally benign. Further, the fibers of the invention will not produce airborne, respirable whiskers, and so do not require expensive handling techniques and do not present health hazards associated with respirable whiskers.

These discontinuous silicon carbide fibers are particularly useful for, but not limited to, incorporation into a filter-heater apparatus for the removal of combustible carbonaceous compounds from a gas stream. For such a use, the fibers are formed via ceramic processing techniques into ceramic sheets or shapes which are then formed into filters. Microwave energy is then applied to the filter periodically, interacting with the silicon carbide fiber providing heat which then burns off any combustible carbonaceous compounds such as diesel soot. Originally, the use of silicon carbide whiskers was investigated for this purpose, but silicon carbide fibers as made by this invention were preferred over whiskers.

BRIEF DESCRIPTION OF THE DRAWINGS

FIG. 14a is a photomicrograph at 200× magnification of silicon carbide fiber having 0.1 wt percent whiskers made in accordance with the method disclosed in Nixdorf, U.S. Pat. No. 6,767,523. FIGS. 14b–d are photomicrographs at 200× magnification of the sample of FIG. 14a to which whiskers were added to yield 0.2, 0.6, and 1.0 wt percent whiskers, respectively.

FIGS. 15a–d are scanning electron microscope (SEM) images at 300× magnification of samples depicted in FIGS. 14a–d.

DETAILED DESCRIPTION OF THE INVENTION

Figure 1A:
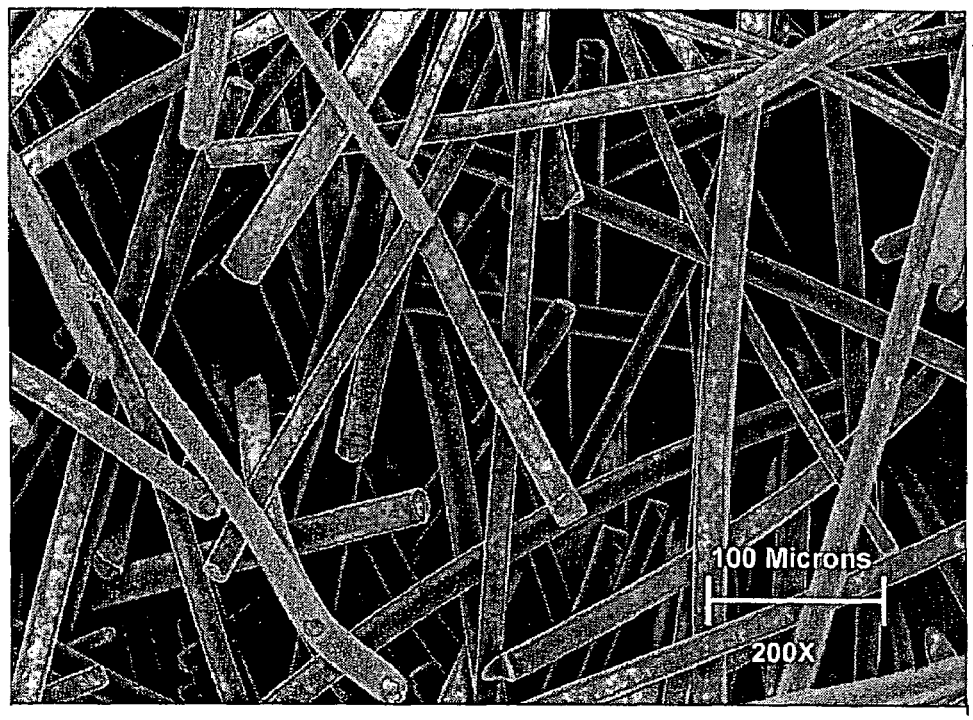
FIGS. 1a–1d are SEM photographs of purchased Carboflex® isotropic carbon fiber grade P-200 at 200× (FIG. 1a) and 500× (FIG. 1c) magnification, and of silicon carbide fiber product of the invention made therefrom at 200× (FIG. 1b) and 500× (FIG. 1d) magnification.

The invention is directed to discontinuous silicon carbide fibers essentially devoid of whiskers, and to products comprising the fibers. Silicon carbide fiber of the invention may be uncoated, or may be coated with silica. The fibers are dense, are low in oxygen and nitrogen, and are devoid of silicon nitride. In accordance with the method of the invention, discontinuous isotropic carbon fibers from a melt spun or melt extruded process and fine silica are mixed, preferably with promoters, dried, and then heated in an essentially inert atmosphere to a temperature and for a time sufficient to form the discontinuous coated or uncoated silicon carbide fibers of the invention.

The method of the invention produces a high yield of discontinuous silicon carbide fibers essentially devoid of whiskers. Silicon carbide fibers of the invention produced using promoters have essentially the same morphology as the carbonized fiber starting material, i.e., smooth discontinuous strands, and therefore are relatively dense and uniform. The fibers are especially suited for incorporation into media such as ceramics, plastics, and metals to, e.g., improve strength and other characteristics thereof. Silica coated fibers of the invention made with promoters are especially easily incorporated into such media. Silicon carbide fibers of the invention produced without both promoters tend to degrade into smaller particles, but do not form whiskers. The silicon carbide fibers of the invention are gray-green in color, thus indicating the relatively low nitrogen content.

Silicon carbide fiber of the invention has relatively low oxygen content because the reaction of silica and carbon is essentially complete. Silicon carbide fiber of the invention has relatively low nitrogen content and is devoid of densifying compounds such as boron or silicon nitride. Because the product silicon carbide fiber is dense, it is not necessary, as it is for silicon carbide fiber made with activated, low-density carbon sources, to undertake to increase the density of this product. Silicon carbide fiber of the invention is not coated with silicon nitrides resulting from a nitrogen post-formation densification treatment.

The method of the invention is economical. The method is carried out at atmospheric pressure in a standard graphite resistance furnace. Therefore, furnaces capable of operating at pressures of less than 1000 Pa, or to as little as 1 Pa, that are required in the prior art and that are expensive and costly to operate, are not necessary.

The method of the invention also does not require additional densification steps after formation of the fiber, thus saving both time and money. In particular, silicon carbide fibers of the invention made with promoters are especially suited for incorporation into ceramic filter media by conventional ceramic processing technology. Such fiber-containing ceramic filter media then is especially suitable for use as regenerable media for filtering combustible carbonaceous compounds from fluids, such as is disclosed in U.S. Pat. No. 5,087,272, the entirety of which is incorporated herein by reference. When regeneration is required, the filter is irradiated with microwave energy. Energy absorbed by the silicon carbide fibers heats the entirety of the filter medium. Heating is continued at a temperature and for a time sufficient to combust carbonaceous compounds trapped by the filter. Silicon carbide fibers of the invention are resistant to degradation even after numerous exposures to microwave energy.

Silicon carbide fibers of the invention may be coated with silica. Such a coating provides additional protection against oxidation at temperatures less than about 850° C.

Silicon carbide fibers of the invention are environmentally more acceptable than silicon carbide whiskers and silicon carbide fibers containing whiskers, as the greater particle size of a fiber is less likely to yield respirable airborne particles. In accordance with the invention, silicon carbide fibers of the invention are essentially devoid of whiskers. As used herein, "essentially devoid of whiskers" means that an area of sample is magnified under a light microscope at a magnification of about 200 or 250×. If a whisker can be seen when examining this area of a first sample in a light microscope at a magnification of about 200× or 250×, then a second sample is examined in a Scanning Electron Microscope (SEM) at a magnification of about 200× or 250×. The approximate area encompassed in such an SEM image is about 0.2 mm$^2$, or 2×10$^5$ square microns. Indeed, this is the area of the SEM photographs used (except for FIGS. 15a–d) in this application.

Calculations illustrate that identification of a sole whisker at 250× magnification means that the whisker content is 1 in 16,600, or about 0.006 wt percent (based on having 20 silicon carbide fibers in the view). If the second view is free of whiskers, the combined observations illustrate a whisker content of 3.6×10$^{-5}$ wt percent. (A third whisker-free view would reduce the content to 2.1×10$^{-9}$ wt percent, or 2.1 ppb.)

The importance of essentially eliminating whisker production during manufacture of silicon carbide fiber is significant. A whisker content of 1 wt percent, as contemplated by U.S. Pat. No. 6,767,523, may generate a health hazard and certainly requires careful handling with appropriate protective equipment during manufacture and subsequent handling. At an average whisker length of 105 microns and a diameter of 1.0 microns (as disclosed in U.S. Pat. No. 4,873,069) and an average fiber length of 1550 microns with a diameter of 7.5 microns (as disclosed in U.S. Pat. No. 6,767,523), it is calculated that there are 43 billion whiskers, or 8.3 whiskers per fiber, in 1 pound of silicon carbide fiber contaminated with 1 wt percent whiskers.

The American Conference of Governmental Industrial Hygienists (ACGIH) recommends a time weighted average (TWA) threshold limit of 0.1 respirable fibers per cubic centimeter per 8 hours for silicon carbide whiskers and fibers. [2003 ACGIH® Silicon Carbide, CAS No. 409-21-2.] Therefore, as can be calculated, processing 1 pound of silicon carbide fiber having 1 wt percent whiskers would require 430,000 m$^3$ of air introduced in laminar fashion to ensure a whisker concentration of 0.1 fiber/cc. Skilled practitioners recognize that at least this much air would have to be evacuated from the workplace and then filtered before reintroduction to the atmosphere. Also, workers would be required to wear personal protective clothing, including respirators, and to exercise special precautions when leaving the plant. Further, there exists the possibility that whiskers may be liberated from products into which they are incorporated. The environmental impact can be significant.

In accordance with the method of the invention, discontinuous isotropic carbon fiber, silica, and preferably promoters, are admixed. The admixture is dried, then heated in an essentially inert atmosphere in a resistance furnace to a temperature and for a time sufficient to form silicon carbide fibers of the invention in accordance with the following generalized formula:

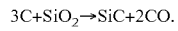

Carbon fibers suitable for use in the invention are known to skilled practitioners as melt spun or melt extruded isotropic carbon fibers. Isotropic carbon fibers, which are melt-spun or melt-extruded from isotropic pitch, are one type of isotropic fiber. Such isotropic carbon fibers are not high-performance fibers and exhibit performance, in areas such as modulus and tensile strength, significantly inferior to that of carbon fibers made from mesophase pitch or polyacrylonitrile (PAN).

The structure of carbon fiber is derived from two causes. First, the fiber takes on an orientation during spinning and drawing. Then, during pyrolytic conversion, or carbonization, most non-carbon atoms are removed and the structure tends to become more graphitic. Isotropic carbon fibers are produced without introduction of graphitic or crystalline structure during formation and carbonization. High-performance carbon fibers derive their properties and characteristics primarily from the orientation introduced during formation, and this graphitic structure persists after carbonization. Both mesophase pitch and PAN fibers are high-performance fibers with a high degree of orientation introduced during spinning and pyrolytic conversion of the precursor fiber.

Carbon fiber suitable for use in the invention is known to skilled practitioners as isotropic carbon fiber, even though such fiber is not purely isotropic. Rather, isotropic carbon fiber has essentially no anisotropy, or visible crystallinity. Isotropic carbon fiber has a small degree of orientation or crystallinity because it is a spun and drawn product. However, isotropic carbon fiber is from an isotropic petroleum pitch or a coal tar pitch and is spun under conditions that minimize anisotropy. In contradistinction, mesophase fibers are processed under specific conditions that form "liquid crystals" during initial processing. These crystals then introduce a significant degree of anisotropy, or of crystallinity, into the spun fibers. Mesophase fiber is such a high-crystallinity anisotropic fiber. PAN fiber also is a crystalline fiber that, on carbonization, yields a highly crystalline high performance fiber.

Mesophase pitch and PAN fibers may be readily distinguished from isotropic fibers by examination under a petrographic optical microscope under crossed Nichols prisms, which skilled practitioners recognize will reveal the high degree of structure in the mesophase and PAN fibers. Mesophase pitch fibers yield superior physical properties, but are not suitable for use in the invention. Similarly, PAN fibers also exhibit high levels of fiber structure and superior mechanical properties. For example, the tensile strength of a "high performance" carbon fiber is approximately 10 times that of an isotropic carbon fiber. Highly structured fibers are not suitable for use in the invention. Graphitic structure is not found in isotropic fiber as it is supplied, although such structure can be introduced by graphitization, i.e., heating the fiber to a high temperature (at least about 1800° C.; more typically, about 2500° C.) for at least about 7 hours. However, a minor presence of such graphitic structure in an isotropic fiber does not cause production of whiskers.

Figure 1B:
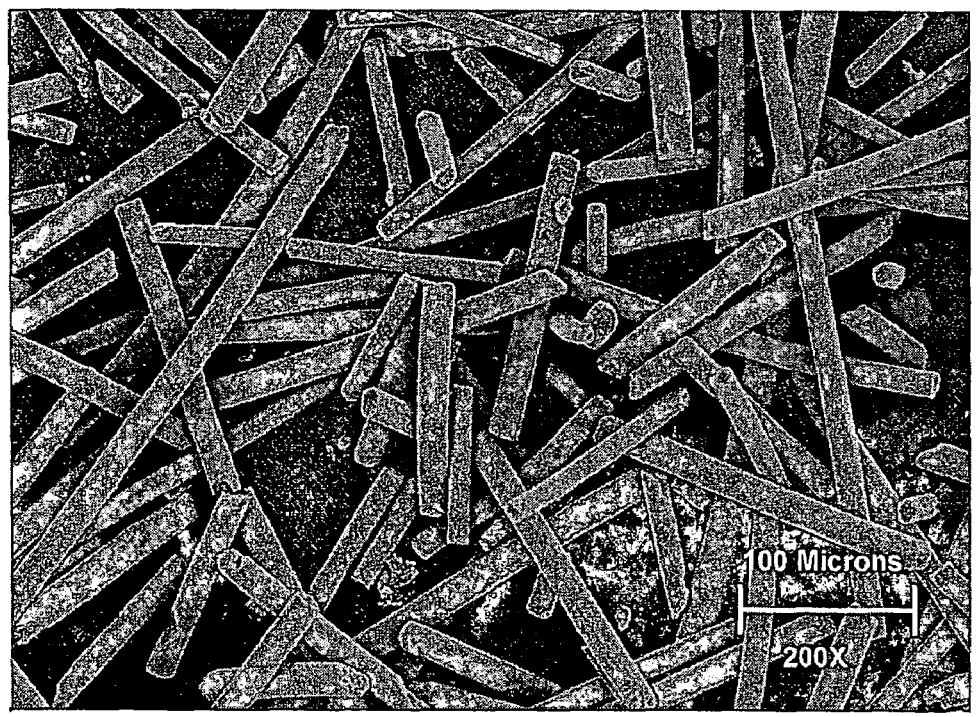
Figure 1C:
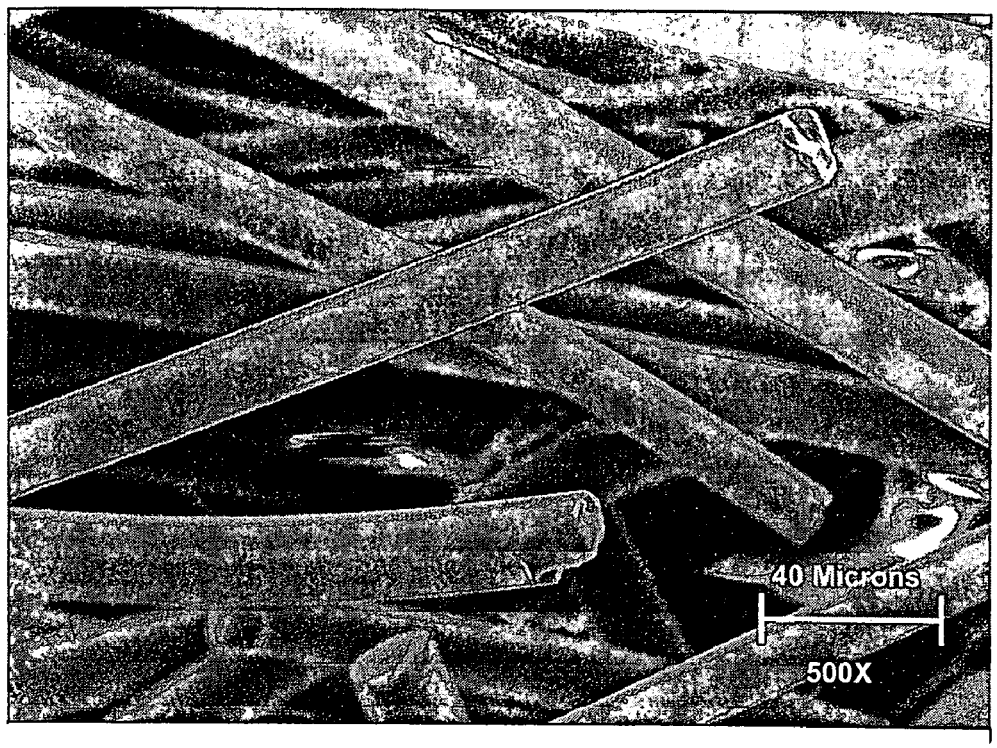

Isotropic carbon fiber suitable for use in the invention is melt-spun or melt-extruded. This method of manufacture imbues the resultant fiber with a uniform cross-section and a smooth, uniform surface generally free of cracks and fissures. Such fibers are straight and smooth, essentially without kinks, knots, or other surface defects, as can be seen in FIGS. 1a and 1c. When isotropic carbon fibers are heated with silica in accordance with the invention, the resulting silicon carbide fiber product is essentially devoid of whiskers. In contrast, when mesophase pitch or PAN is used as the carbon fiber, significant whisker production is visible in an SEM photograph at 200× magnification.

Suitable carbon fiber is melt-spun or melt-extruded from isotropic pitch, then is pyrolyzed. Suitable carbon fiber of this invention does not have graphitic structure or crystallinity. Typically, carbonized melt-spun or melt-extruded homogenous carbon fiber is devoid of a graphitic structure. However, as noted above, minor portions of graphitic structure present in an otherwise homogeneous isotropic fiber does not cause production of whiskers in accordance with the method of the invention. Carbon fiber preferred in the invention forms no more than incipient graphitic structure after treatment at 1800° C. for 7 hours in an argon atmosphere.

Another form of suitable carbon fiber is derived from a low-orientation, predominantly amorphous, melt-spun polymeric filament. This polymeric filament is subsequently pyrolyzed into a low-orientation carbon fiber that is devoid of graphitic structure. One suitable polymer is phenol-formaldehyde resin. Carbon fiber formed from such resin and devoid of graphitic structure is within the class of isotropic carbon fiber for the purposes of this invention. Kynol is the registered trademark for commercially available low-orientation carbon fibers derived from low orientation, predominantly amorphous, melt-spun phenol-formaldehyde resin. Kynol also is within the class of isotropic fibers suitable for use in this invention.

The skilled practitioner recognizes that many measures of density exist. As used herein, "apparent density" is defined as the mass of a composition divided by the total volume of the solid matter plus the volume of both the open and the closed pores. Apparent density is determined by mercury intrusion porosimetry. "True density" is defined as the mass of the material divided by its volume, excluding open and closed pores. True density is determined by helium pycnometry. ASTM D5004 defines bulk density as the mass of particles divided by the volume they occupy, including the spaces between particles. Bulk density is determined by mercury displacement. Theoretical density is the ratio of the mass of a collection of discrete pieces of solid material having an ideal regular arrangement at the atomic level to the sum of the volumes of said pieces. Theoretical density is determined by x-ray diffraction.

Suitable carbon fiber is more dense than carbonized cotton fibers and activated carbon fiber. Indeed, activated carbon fiber is made from dense carbon fiber by treatment that makes the fiber porous and lowers its density. Typically, such activated carbon fibers have an apparent density of between about 0.9 to about 1.15 g/cc, based on mercury intrusion porosimetry. One suitable porosity determining device is the "AutoPore IV 9500" available from Micromeritics Instrument Corporation in Norcross, Ga. The greater apparent density of suitable carbon fiber for use in the invention is the result of the dense, homogeneous structure of such fibers, which has few pores. Typically, the apparent density of carbon fiber used in the invention is greater than about 1.3 g/cc, based on mercury intrusion porosimetry. Preferably, the apparent density of suitable carbon fiber is greater than about 1.35 g/cc, more preferably greater than about 1.5 g/cc, and most preferably greater than about 1.8 g/cc. The skilled practitioner will, with the guidance provided herein, be able to identify suitable carbon fiber.

The length of isotropic carbon fiber suitably used in the invention is limited only by economics and commercial practicality. Isotropic carbonized fiber of essentially any length can be used in the method of the invention to yield silicon carbide fiber in accordance with the invention. However, typically, the length of commercially available fiber does not exceed about 25 mm. Fibers that are longer than about 1 mm will yield silicon carbide product having low bulk density (even though the particles are dense), increasing the cost of furnace treatment, packaging, transportation, and storage.

The diameter of isotropic carbon fiber typically is less than about 25 microns. Diameters greater than this are not preferred because it is difficult to ensure completeness of reaction at the core of such a relatively large diameter fiber. Typically, such carbon fiber has a specific surface area of less than about 100 $m^2/g$, more typically less than about 50 $m^2/g$, and most typically between about 10 and about 35 $m^2/g$. The ability to select the length and, to a lesser extent, to select the diameter, of the carbon fiber used in the invention provides the skilled practitioner the ability to select and control properties and characteristics of the silicon carbide fiber product. Thus, the skilled practitioner is afforded the opportunity to affect, for example, filtration efficiency, permeability, and other characteristics of products using silicon carbide fibers of the invention. Silicon carbide fibers derived from cotton (such as used in Nixdorf, U.S. Pat. No. 6,767,523) do not offer this design flexibility.

Isotropic pitch carbon fibers available from Anshan East Asia Carbon Fiber Co. Ltd. Anshan, Liaoning, China under the tradename Carboflex® grades P-200 and P-600 are preferred in the invention. Anshan Carboflex® C-25, a 25 mm long carbon fiber made from melt-spun isotropic pitch, also is a preferred carbon fiber. Carboflex® P-200 is especially preferred. The fibers typically have an average length of 200 microns; diameters range from about 5 to 25 microns with an average of 15 microns. Longer or shorter lengths can be used depending on end use. These Anshan fibers are believed to be milled or chopped, then classified by length.

The Carboflex® P-200 fiber as obtained typically has a surface area of between about 20 and 30 $m^2/g$. Heat treatment of P-200, for example at a temperature of at least about 1500° C. for at least about 1 hour, slightly reduces the average diameter and degrades the length. The specific surface area of the heat treated fibers was markedly reduced, to about the same level as the mesophase and PAN fibers investigated, or about 0.5 $m^2/g$. Such pre-treatment adds dimensional stability.

Particulate silica from any source may be used in the present invention, including, but not limited to, granular silica, solid aerosol silica, and colloidal suspensions of silica.

Regardless of the silica source, it is preferred that the particles be no larger than about 0.5 μm (5000 Å), preferably less than about 0.3 μm (3000 Å), and most preferably less than about 0.1 μm (1000 Å). A preferred silica source is Cab-O-Sil® grade M5, available from Cabot Corp., Tuscola, Ill. This product is fumed silica having a surface area of about 220 $m^2/g$ and an approximate bulk density of 0.07 g/cc.

Promoters preferably are used in the method of the invention to enhance the integrity of the silicon carbide fiber formed. Use of promoters yields integral silicon carbide fibers having essentially the same morphology as the isotropic carbon fiber starting material. Promoters most preferably are used in combination. One type of promoter is a metal-containing promoter selected from the group consisting of salts, compounds, and complexes of iron, cobalt, or nickel, and blends thereof. These salts, compounds, and complexes may be converted to oxides of iron, cobalt, or nickel at a temperature less than about 650° C. A second type of promoter is selected from the group consisting of the salts, compounds, and complexes of alkali metals or alkaline earth metals, and blends thereof. These salts, compounds, and complexes may be converted to oxides of these materials at the reaction temperature employed. When a single type of promoter is used, it may be any of the promoters. If two types of promoters are used, one promoter is selected from each type. A blend of promoters of one type will be referred to as "one promoter" herein for convenience.

Preferred metal-containing promoters include iron oxide, ferrous sulfate, potassium ferrocyanide, cobalt oxide, cobalt sulfate, nickel oxide, and nickel sulfate. Ferrous sulfate ($FeSO_4$) is an especially preferred promoter. The especially preferred metal-containing promoter is present in an amount between about 0.5 and about 5.0 wt percent of the fiber/silica blend; preferably between about 0.7 and about 3.0 wt percent; more preferably between about 1.0 and about 2.0 wt percent; and most preferably between about 1.3 and about 1.7 wt percent. Metal-containing promoters other than ferrous sulfate are present in an amount sufficient to provide the mole quantity of metal equivalent to the mole quantity of iron.

Preferred alkali metal- and alkaline earth metal-containing promoters include calcium oxalate, barium oxalate, strontium oxalate, and potassium oxalate. Calcium oxalate is especially preferred. This promoter typically is present in an amount between about 0.2 and about 3.0 wt percent of the fiber/silica blend, preferably between about 0.25 and about 2.0 wt percent; more preferably between about 0.4 and about 1.0 wt percent; and most preferably between about 0.5 and about 0.7 wt percent. Alkali metal- and alkaline earth metal-containing promoters other than calcium oxalate are present in an amount sufficient to provide the mole quantity of alkali metal or alkaline earth metal equivalent to the mole quantity of calcium.

The metal-containing promoter and the alkali metal- or alkaline earth metal-containing promoter may be provided in a single composition. Thus, a single composition that contains both metal promoter and alkali metal or alkaline earth metal promoter may be used to provide at least two promoters in accordance with the method of the invention.

With the guidance provided herein, a skilled practitioner can select suitable salts, compounds, and complexes to serve as promoters. For example, a skilled practitioner recognizes that, at the reaction temperatures used in the method of the invention, most promoters will be converted to an oxide form. However, one must exercise care in selecting promoter compositions. For example, ferrous nitrate ($Fe(NO_3)_2 \cdot H_2O$) is not a suitable promoter composition because it degrades if the feed mixture is heated while still wet, whereas ferrous sulfate ($FeSO_4$) is a preferred promoter composition.

The promoters are used in a quantity sufficient to assist the conversion of carbon fibers to silicon carbide and to promote fiber quality. Suggested quantities of promoter compositions are specified herein; with this guidance, skilled practitioners will be able to determine appropriate quantities of other suitable promoters.

The inventors have observed that the combination of a metal-containing promoter and an alkali metal- or an alkaline earth metal-containing promoter is particularly effective in providing high quality fibers essentially devoid of whiskers and having essentially the same morphology as the carbon fiber from which it is made. Skilled practitioners recognize that the essentially complete absence of whiskers is a completely unexpected result, as either calcium or iron is used individually in whisker manufacture to promote whisker production.

Silicon carbide fiber of the invention maintains the morphology of the isotropic carbon fiber from which it is made. Skilled practitioners recognize that some degradation in fiber length is to be expected during manufacturing and handling. However, silicon carbide fiber of the invention will be dense, smooth fibers essentially devoid of whiskers, as illustrated in the SEM photographs and photomicrographs shown in the Figures.

Skilled practitioners recognize that the theoretical density of β-, or cubic, silicon carbide is 3.21 g/cc. The true density of silicon carbide fiber of the invention is at least about 3.0 g/cc, preferably at least about 3.05 g/cc, and more preferably at least about 3.1 g/cc.

The high true density of silicon carbide fiber of the invention contributes significantly to the high apparent density of silicon carbide fiber of the invention. The high true density is indicative of nearly total conversion to silicon carbide. This high true density is achieved in accordance with the method herein, without addition of densification agents such as boron or densification steps, such as a high-temperature treatment in the presence of nitrogen to densify the fiber. Rather, silicon carbide fiber of the invention is homogenous, devoid of boron, and low in nitrogen.

The apparent density of discontinuous silicon carbide fiber of the invention is between about 0.35 to about 0.65 g/cc higher than the apparent density of the starting carbon fiber. Therefore, the apparent density of discontinuous silicon carbide fiber of the invention is greater than about 1.65 g/cc, and preferably greater than about 1.85 g/cc. More preferably, the apparent density of silicon carbide fiber of the invention is greater than about 2.0 g/cc, and most preferably is greater than about 2.2 g/cc. Skilled practitioners recognize that apparent densities greater than about 1.65 g/cc have not been obtained in the prior art with discontinuous silicon carbide fibers made essentially devoid of whiskers and without densifying agents.

SEM photographs show that silicon carbide fiber products of the invention are essentially devoid of whiskers even when promoters are used individually or are omitted completely. FIGS. 1b, 1d, and 4 through 11 show that no whiskers can be seen in product of the invention at 200× magnification.

In particular, SEM photographs of the product of the invention made with promoters (FIGS. 1b, 1d, and 4–8) illustrate that the morphology of the silicon carbide fibers is essentially the same as that of the isotropic carbon fiber starting material. This result is completely unexpected, as prior methods used iron and calcium salts as promoters of whisker growth. The surfaces of the silicon carbide product look smooth even at 500× magnification.

Figure 9:
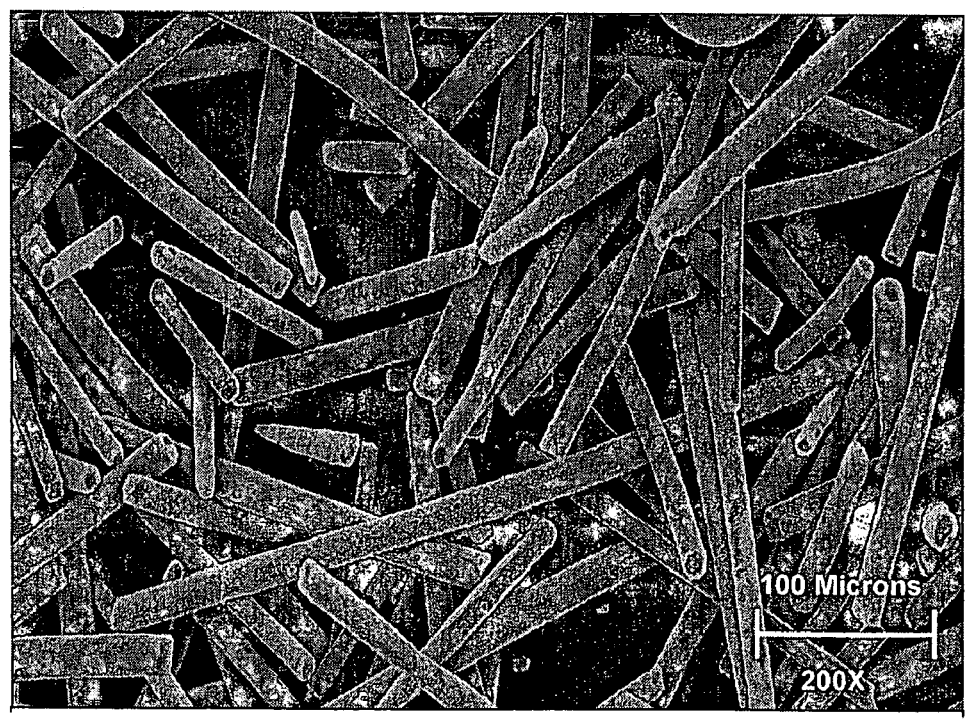
FIG. 9 is an SEM photograph at 200× magnification of silicon carbide fiber of the invention made from P-200 isotropic carbon fiber without calcium oxalate.
Figure 10:
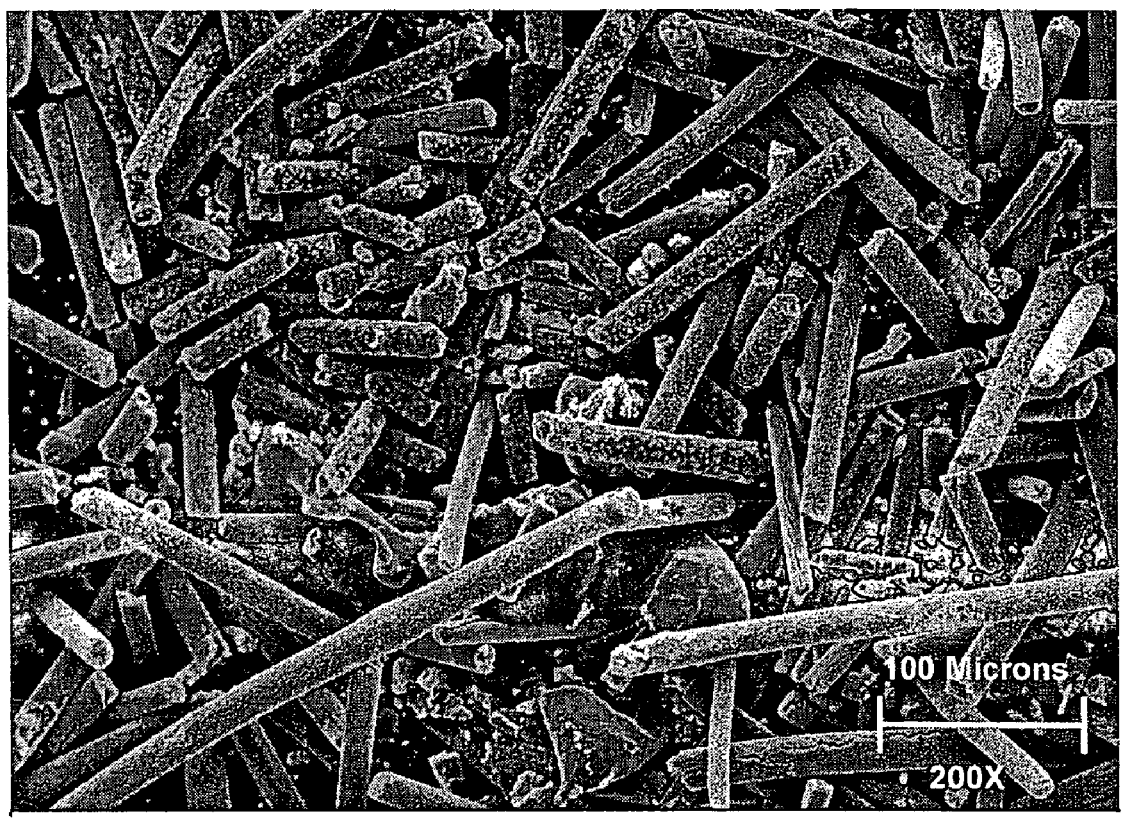
FIG. 10 is an SEM photograph at 200× magnification of silicon carbide fiber of the invention made from P-200 isotropic carbon fiber without ferrous sulfate.
Figure 11A:
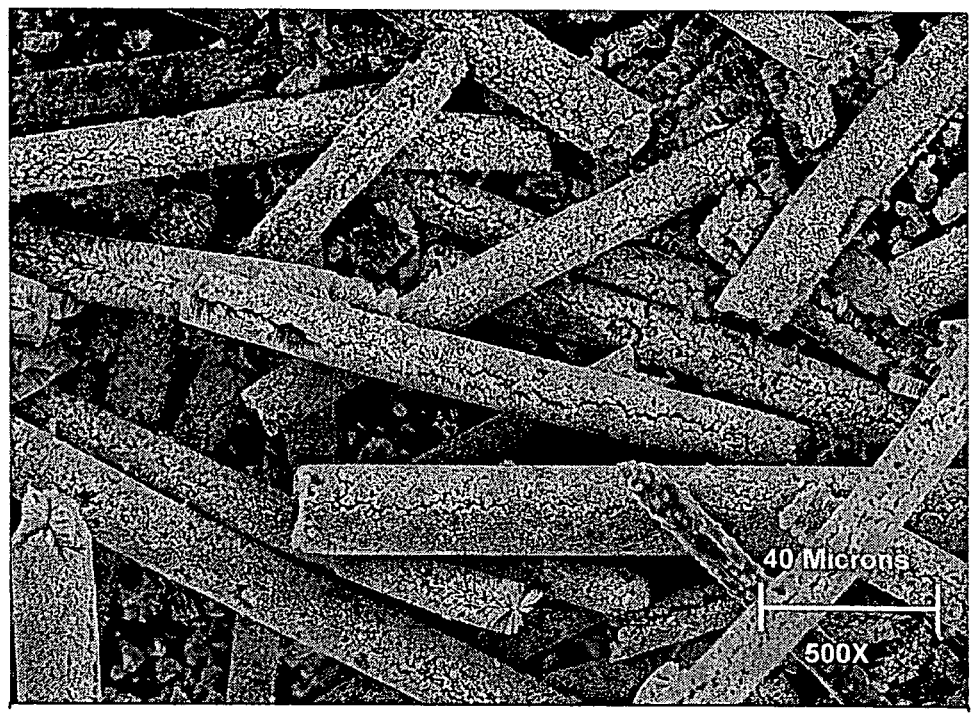
FIGS. 11a and 11b are SEM photographs of silicon carbide fiber of the invention made from P-200 isotropic carbon fiber without any promoters at 500× (FIG. 11a) and 5000× (FIG. 11b) magnification.
Figure 11B:
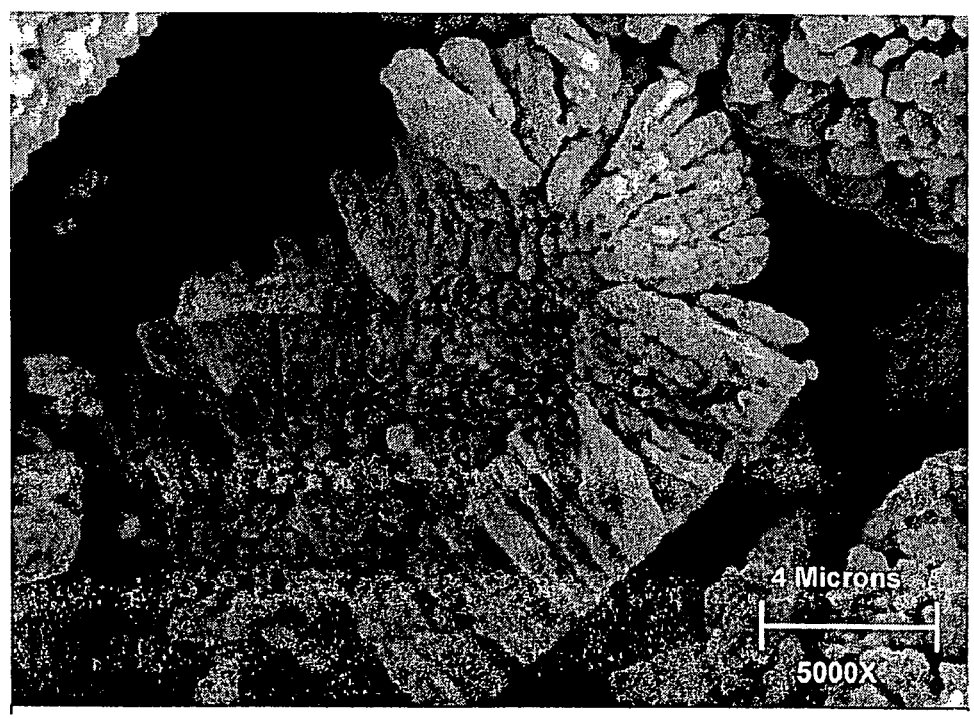

FIG. 9 shows that no whiskers can be seen at 200× magnification in an SEM of silicon carbide fiber produced without calcium promoter, and FIG. 10 illustrates the same phenomenon for silicon carbide fiber produced without iron promoter. FIGS. 11a and 11b show that no whiskers can be seen at 500× and 5000× magnifications, respectively, in silicon carbide fiber of the invention made without promoters.

FIGS. 9–11 illustrate that, whereas promoters are not needed to inhibit whisker production, use thereof produces silicon carbide fibers that are not degraded. FIGS. 9–11 illustrate that without both iron and calcium salts present, the silicon fiber product fibers of the invention are degraded and form smaller particles of fiber, but do not form whiskers. Promoters do not appear to affect the ultimate conversion of the carbon and silica starting materials to silicon carbide.

Although the inventors do not wish to be bound by theory, it is believed that silicon carbide fiber of the invention is produced essentially devoid of whiskers in accordance with the invention because the carbon fibers are smooth, with minimal cracks and fissures, and are free of asperities and voids that provide whiskers an opportunity to form. FIGS. 9–11, which are free of whiskers, were made without promoter.

Formation of whiskers is promoted by the presence of void space in the starting materials. U.S. Pat. No. 4,873,069, directed to production of silicon carbide whiskers, discloses that starting materials having void volume of at least about 40 percent, and preferably 80–90 percent, is required for whisker growth. This patent discloses that such void volume gives sufficient space for whisker growth. The dense, relatively low porosity carbon fiber used in the invention does not facilitate such growth.

As described herein, use of promoters yields silicon carbide fiber of substantially the same length as that of the carbon fiber starting material. Although not wishing to be bound by theory, the inventors believe that the smooth nature of carbon fiber allows the promoters to completely cover and coat the outside surfaces of the fibers, thus further reducing the likelihood of whisker nucleation and growth while improving resistance to degradation, especially in length.

The properties and characteristics of the carbon fiber starting material are believed to make a significant contribution to the whisker-free nature of the silicon carbide fiber produced herein. The surface of carbonized cotton fiber is irregular, fibrilar, and has many asperities, and the fibers are quite porous. Therefore, even application of promoters appears not to be effective at eliminating whisker nucleation for such fibers. This is shown in U.S. Pat. No. 6,767,523, wherein the fiber contains whiskers. Although the inventors do not wish to be bound by theory, it is believed that the fibrils and asperities of carbonized cotton fiber cause at least some of the promoters applied to the fiber surface to form small beads or droplets that could initiate whisker production. Further, although the inventors do not wish to be bound by theory, it is believed that carbonized cotton fibers may contain trace metallic compounds (from the soil in which the cotton was grown) not vaporized on carbonation that may act as sites for whisker nucleation and growth.

FIGS. 1a and 1c are SEM photographs of Carboflex® P-200 isotropic carbon fiber at 200× and 500× magnification, respectively. The isotropic carbon fibers appear to have very smooth surfaces. Table 1 below summarizes physical properties and characteristics of divers discontinuous carbon fibers, including the samples depicted in FIGS. 1a and 1c. The specific surface area of this fiber as obtained was determined to be 28.7 $m^2/g$, which would indicate the fiber has significant void volume. However, it was found to be very difficult to obtain a good reproducible specific surface area. Preheating the fiber made it easier to obtain reproducible specific surface area measurements and reduced the sulfur content of the fiber. The specific surface areas of heated fibers obtained were much closer to that expected of a void-free, smooth-surfaced fiber, as set forth in Table 1. Specific surface areas of both the initial carbon fibers and the silicon carbide fiber product were determined employing the BET method.

TABLE 1

| Discontinuous Carbon Fiber | Apparent Density, g/cc | Surface Area, m²/g | Sulfur Content, wt % | Avg. Length, microns | Avg. Diameter, microns |
|---|---|---|---|---|---|
| Isotropic Pitch, Carboflex ® P-200 | 1.98 | 28.7 | 1.43 | 201 | 15.1 |
| Isotropic Pitch, Carboflex ® P-600 | 1.96 | | 0.59 | 313 | 14.2 |
| Carboflex ® P-200 pretreated for | | | | | |
| 1 hour at 1500° C. | 1.53 | 0.5 | 0.85 | 114 | 11.9 |
| 1 hour at 1800° C. | 1.53 | 0.4 | 0.26 | 114 | 12.1 |
| 7 hours at 1800° C. | 1.54 | 0.3 | 0.36 | 133 | 11.6 |
| Mesophase Pitch Fiber, Cytec ThermalGraph ® DKD X | 2.19 | 0.5 | ≦0.1 | 118 | 6.9 |
| PAN, Fortafil ® M275 | 1.76 | 0.5 | ≦0.1 | 219 | 9.0 |

The Carboflex® carbon fibers described in Table 1 are commercially available from Anshan East Asia Carbon Fiber Co. Ltd., Anshan, Liaoning, China. Both P-200 and P-600 are isotropic carbon fibers derived from pitch. The Anshan pretreated fibers also were heated to the indicated temperature and held for the stated time. The pretreated fibers were somewhat degraded in length and diameter but otherwise appeared unchanged. XRD (x-ray diffraction) showed the incipient formation of graphitic structure in the fiber heated for 7 hours. However, the carbon fibers are suitable for use in this invention.

The mesophase pitch carbon fiber was obtained from Cytec Carbon Fibers, 7139 Augusta Road, Piedmont, S.C. 29673. The PAN carbon fiber was obtained from Fortafil Fibers, Inc., P.O. Box 357, Roane County Industrial Park, Rochester, Mich. 48306.

Figure 12:
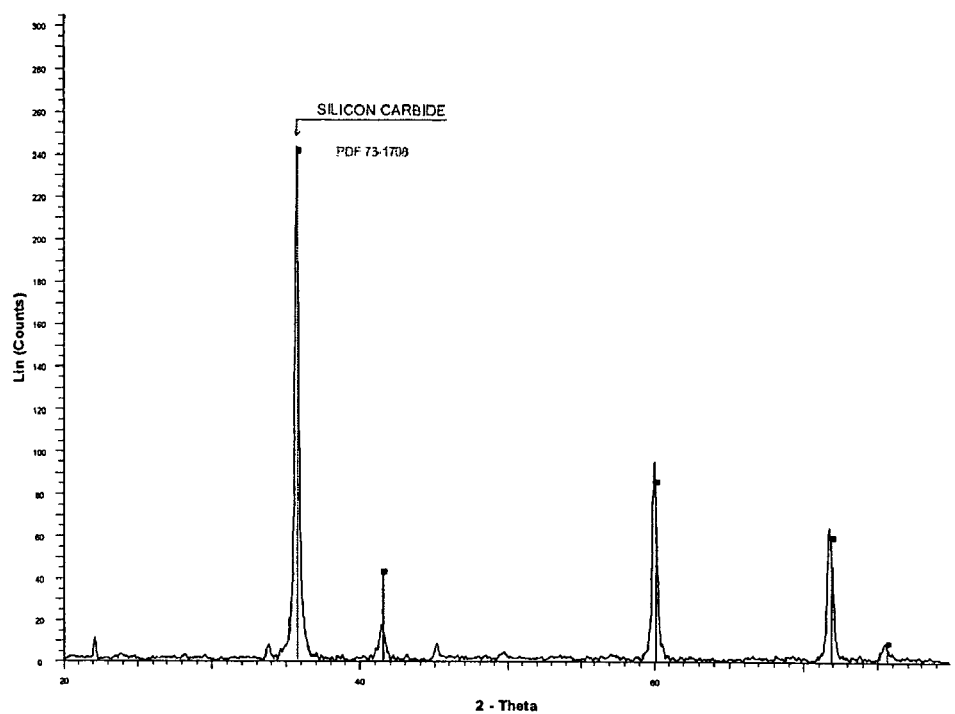
FIG. 12 is a plot of x-ray diffraction data for silicon carbide fiber of the invention.

FIG. 12 is a plot of x-ray diffraction data for a silicon carbide fiber of the invention exemplified in Example 1. FIG. 12 illustrates that the silicon carbide fiber of the invention is essentially β-silicon carbide with a cubic crystal structure. As can be seen on that Figure, there is a large peak labeled "PDF 73-1708." Skilled practitioners recognize that 'PDF' stands for Powder Diffraction File, as compiled by the National Institute of Standards and Technology Crystal Data Center and the International Centre for Diffraction Data. In that identification scheme, PDF 73-1708 is the identification of β-silicon carbide. There also is a small peak at the 2Θ value of 22 degrees, which represents cristobalite, a high temperature form of silica. Another very small peak occurs at 2Θ of 45 degrees, representing α-silicon carbide with a hexagonal crystal structure. Thus, it can be seen that product of the invention is essentially all β-silicon carbide.

Silicon carbide fiber of the invention is a gray-green fiber material that is essentially all β-silicon carbide and has essentially the same morphology as the carbonized fiber starting material if promoters are used. X-ray diffraction analyses confirm that silicon carbide fiber of the invention is essentially β-silicon carbide.

FIG. 12 also indicates that silicon carbide fiber of the invention does not have a coating, such as boron or silicon nitrides, and does not contain a significant amount of nitrogen. Whereas the prior art teaches that boron, nitrogen, and silicon nitrides are necessary to densify the porous products resulting from the porous carbon fiber starting material, silicon carbide fiber of the invention is free of boron and silicon nitrides. Also, the nitrogen content of the silicon carbide fiber of the invention is low because it is not densified in nitrogen.

Silicon carbide fiber of the invention is essentially devoid of boron because no boron-containing compounds are added to the surface to densify it. As used herein, 'essentially devoid of boron' means that no boron is added to the surface of the silicon carbide fiber to densify it. Because no boron is added, silicon carbide fiber of the invention has less than 0.1 wt percent boron, preferably less than about 0.05 wt percent, more preferably less than about 0.03 wt percent, and most preferably less than about 0.01 wt percent boron. Both nitrogen and oxygen will be present, but at levels significantly lower than those found in the prior art. Silicon carbide fiber of the invention has an oxygen content less than about 0.9 wt percent, and a nitrogen content of less than about 1.25 wt percent, typically less than about 1.1 wt percent, more typically less than about 0.9 wt percent, and most preferably typically less than 0.75 wt percent.

Silicon carbide fibers of the invention also may comprise a coating of silica. Silica-coated fibers of the invention are more easily processed into ceramic filter media than uncoated fibers and are better able to resist oxidation during repeated microwave energy exposures.

The silicon carbide fiber product quality is improved by employing a non-stoichiometric ratio of carbon fiber and silica. Whereas the stoichiometric ratio is 3 moles of carbon per mole of silica, silicon carbide fiber of the invention is made using a mole ratio of carbon to silica of between about 2.4:1 to about 3.5:1, preferably between about 2.5:1 and about 3.0:1, and most preferably between about 2.6:1 and about 2.8:1. If an excess of silica is employed in the initial blend, the silicon carbide fiber may be coated with silica. If an excess of carbon is employed in the initial blend, unreacted carbon may be found in the core region of the silicon carbide fiber. Any silica coating due to excess silica in the feed may be removed by washing the fiber with hydrofluoric acid (HF) if so desired.

Skilled practitioners recognize that the water-gas reaction,

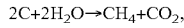

$$2C + 2H_2O \rightarrow CH_4 + CO_2,$$

will cause loss of some carbon during the drying period if the temperature exceeds about 250° C. Thus, this reaction must be considered when determining the relative quantities of carbon and silica in the reactant mix. For example, skilled practitioners recognize that the amount of water in the reactant mixture, and in the atmosphere in the reaction boat, will affect how much carbon may be lost to this reaction, and thus can take steps to minimize the quantity of free water present.

In accordance with a preferred method of the invention, the carbon fiber first is "opened," or decompacted. Such decompacting helps ensure that the various components can be thoroughly mixed before heating. Typically, the "opening" can be effectuated by a laboratory single blade mixer, especially a mixer in which the feed component admixture is to be formed. A short period (less than 5 minutes) is sufficient for thorough decompacting and mixing.

The metal-containing promoter, preferably $FeSO_4$, then is added. While the $FeSO_4$ fiber mixture is being blended, the preferred calcium-containing promoter, calcium oxalate, is added immediately after the other promoter is added. Because the quantity of calcium oxalate to be added is small relative to the volume of the fibers, it is preferred to disperse this promoter in a volatile carrier (e.g., ethanol or water). Preferably, a suspension of calcium oxalate is prepared, then added to the reactants during agitation. Skilled practitioners are familiar with techniques for adding such quantities of promoters. Typically, 3 minutes of blending is sufficient at this step. It is especially preferred that both promoters be added simultaneously by forming a suspension of calcium oxalate in an aqueous solution of ferrous sulfate. This embodiment not only shortens the mixture preparation time, but also minimizes the quantity of water present in the reactant mixture. The silica then is added to the admixture. Blending for about another two minutes typically is sufficient to form a homogenous, free-flowing blend. The quantity of silica and carbon fiber preferably is selected to provide a molar reactant ratio of carbon to silica of between about 2.6:1 and about 2.8:1.

For drying and subsequent reaction, the reactant blend is loaded into a graphite "boat" which then is capped. The "boat" is passed into a resistance furnace through a muffle furnace. While the boat is in the muffle furnace, the temperature is increased in steps, e.g., to 250° C., then to 500° C., and then to 750° C. During this heating, some of the water in the reactants and in the atmosphere may react with carbon in accordance with the water-gas reaction described above, and some carbon may be lost.

In accordance with the method of the invention, the boat containing the dried reactant mixture then is moved into a graphite resistance furnace and heated in an essentially inert atmosphere at a temperature between about 1450° C.–1800° C. for a time sufficient to form the silicon carbide fibers of the invention. If the temperature of the furnace is low, the reaction rate is slow, especially below about 1450° C. At temperatures above 1800° C., the quality of the fibers deteriorates; fiber length is degraded and detritus is formed.

The preferred temperature for the reaction is between about 1500° C.–1775° C., more preferably between about 1650° C.–1750° C. At 1675° C., more than 95 percent of the carbon is converted to silicon carbide fibers.

As used herein, an "essentially inert" atmosphere is an atmosphere which is essentially inert to all reactants and the environs (e.g., the furnace itself and other objects in it), and which does not produce whiskers. Argon is a preferred gas for use as an essentially inert atmosphere in the invention. It is likely that the other inert gases, also known as the "Noble gases," i.e., Group 18 (formerly Group VIIIA) of the periodic table of the elements, and helium also are suitably used in the invention. A Noble gas, or a blend thereof, is present in the essentially inert atmosphere used in the method of the invention.

Pure nitrogen appears to lead to formation of whiskers, and so is not preferred an "essentially inert" atmosphere gas. The inventors have found that use of a nitrogen atmosphere contributes to whisker formation. With the guidance provided herein, a skilled practitioner will be able to identify suitable "essentially inert" atmospheres for use in the invention.

The reaction is carried out in any suitable furnace. Graphite resistance furnaces are particularly suitable. Such furnaces are well known to skilled practitioners. One such furnace is described in Beatty, U.S. Pat. No. 4,837,924, the entirety of which is incorporated herein by reference.

Silicon carbide fiber product of the invention has morphology essentially the same as that of the starting carbon fiber material. The diameter and length of the fibers remains essentially unchanged. This means that the density of the silicon carbide fiber product is higher than the density of the carbon fiber starting material. The silicon carbide fiber is homogenous and the entire carbon fiber is converted to silicon carbide fiber. Thus, there is no unreacted core.

Theoretical conversion of 100 percent of the reactants to silicon carbide would yield a maximum 41.7 wt percent bound silicon carbide; the balance would be gaseous carbon monoxide. The yield of silicon carbide fiber by the method of the invention is high. For example, after 1 hour in argon at 1675° C., a blend of silica and carbon in a molar ratio of 2.7 carbon per 1 silica, together with 1.5 wt percent $FeSO_4$ and 0.6 wt percent calcium oxalate, yielded 96.1 percent of the maximum possible conversion as silicon carbide. In accordance with the method of the invention, conversion generally is at least 80 percent, preferably is about 85 percent, more preferably is at least about 90 percent, and most preferably is at least above 95 percent of the maximum possible silicon carbide conversion.

It has been discovered that the sulfur content of isotropic pitch carbon fiber, which exceeded about 0.25 wt percent even after pre-treatment, surprisingly did not have an adverse effect on conversion of carbon to silicon carbide. At a sulfur concentration greater than about 0.25 wt percent, skilled practitioners would have been expected an adverse effect on quality and conversion.

Product composition is reliably determined by a combination of three methods. Residual silica that did not react to form silicon carbide fiber is measured using HF leaching to remove the silica. Unreacted carbon is calculated by "burn out" at 600° C., i.e., heating the fiber at 600° C. in air to combust any residual carbon. The weight lost is determined. Then, after unreacted carbon is removed, total carbon present in the form of the silicon carbide is determined using a carbon analyzer manufactured by the Laboratory Equipment Company (LECO) of Benton Harbor, Mich., to determine overall conversion to silicon carbide.

The absorption of microwave energy is easily and quickly confirmed. A cavity 1.0 inches in diameter by 0.25 inches deep in a 3×3×2 inch rigid Kaowool® insulation block (microwave transparent) is filled with silicon carbide fibers of the invention. The fiber-filled block is placed at a specific spot in a 1 kilowatt, 2.45 GHz microwave oven and heated until the fibers achieved red heat, i.e., about 750–800° C. Each of the preferred fiber products described in the Examples achieved red heat at a rate of about 125° C. to more than about 250° C. per second.

The microwave response of silicon carbide fiber of the invention can be used to advantage by including silicon carbide fiber in ceramic filter media to form a regenerable diesel particulate trap. After a cycle of absorbing particulate material from diesel motor exhaust, the trap then is regenerated by exposure to microwave energy and air. The silicon carbide fiber absorbs the microwave energy and becomes hot, thus combusting and vaporizing the particulates.

Silicon carbide fiber of the invention also can be put to other uses. It can be formed into wet-laid non-woven webs. Silicon carbide fiber of the invention is particularly suited for such uses because it has the form of rigid rods of essentially the same length.

Skilled practitioners are aware of known method for making wet-laid non-woven webs. Typically, silicon carbide fiber of the invention is dispersed in water to make a wet-laid furnish. The furnish then is introduced to a Fourdrinier machine or other suitable wet-laid forming device and is dewatered to form a non-woven web.

Non-woven webs thus made have basis weights exceeding about 15 g/m², and can have basis weights exceeding 500 g/m². Suitable binders, such as self-crosslinking emulsions and high temperature ceramic binders, also can be used. Non-woven web thus made is suitable for many uses with additional processing including filter media, gaskets, mats, thermal insulation, microwave-susceptible heating devices, and engineered constructs. The web can be bonded with resin or coated with various compositions by chemical or physical vapor deposition processes. With the guidance provided herein, the skilled practitioner will be able to put silicon carbide fiber of the invention to many uses.

As set forth above, the silicon carbide fibers of the present invention are β-silicon carbide. This determination is made by x-ray diffraction techniques in a manner known to skilled artisans.

The absence of whiskers in silicon carbide fiber product of the invention is illustrated by SEM photographs of well-dispersed samples. Whiskers are not found even in degraded silicon carbide of the invention in SEM photographs at 200× magnification.

EXAMPLES

The following examples are meant to illustrate the invention, not to limit it in any way. For example, isotropic carbon fibers from any source may be used. Similarly, other forms of silica can be used. The scope of the invention is limited only by the claims.

Throughout the Examples, "wt percent" means, "weight percent based on the combined weight of the carbon fiber and silica" when referring to starting materials.

Example 1

Quantities of discontinuous divers carbon fibers were used to form silicon carbide fiber. Carbon fiber was placed in a plow mixer equipped with a high-speed chopper and "opened" for 1 minute. With the mixer still running, an aqueous dispersion of ferrous sulfate and calcium oxalate was added. The quantity of $FeSO_4$ was sufficient to provide 1.5 wt percent $FeSO_4$ based on the combined weight of the carbon fiber and silica to be added immediately thereafter. The quantity of calcium oxalate was sufficient to provide 0.6 wt percent calcium oxalate based on the combined weight of carbonized fiber and silica to be added.

After 3 minutes of blending, a quantity of Cab-O-Sil® grade M5, a fumed silica, sufficient to provide 2.7 moles of carbon per mole of silica was added. Two additional minutes of blending followed.

The blend product was loaded into capped graphite crucibles, placed in a laboratory graphite furnace and slowly dried at less than 250° C. under flowing argon. Then, the temperature was raised to 1675° C. and held for one hour under flowing argon. The sample was allowed to cool and was examined.

The carbon fibers used in this Example are the same as those described in Table 1, and were used in equal mass quantities. Only the silicon carbide product made from Carboflex® P-200 is an example of the invention; silicon carbide fibers from the other two fibers are comparative examples.

Product properties are summarized and related SEM photographs are identified in Table 2 below:

TABLE 2

| Discontinuous Carbon Fiber, Source | Product | | | | |
|---|---|---|---|---|---|
| | Wt % SiC Conversion | Whiskers | FIG. | Unreacted Carbon, Wt % | Extractable Silica, wt % |
| Isotropic Fiber, Anshan Carboflex® P-200 | 96.1 | None | 1b, 1d | None Detected | None Detected |
| Mesophase Pitch Fiber, Cytec Thermal-Graph® DKD X | 97.0 | Numerous | 2 | 0.3 | 0.2 |
| PAN Fiber, Fortafil® M275 | 103.6 | Numerous | 3 | 4.6 | 0.5 |

X-ray diffraction analysis shows the fibers prepared from P-200 to be predominantly β-silicon carbide, as illustrated in FIG. 12.

The unreacted carbon was determined by 600° C. burn-out in air, and the extractable silica by HF extraction. The wt percent silicon carbide conversion was determined by calculating what fraction of the carbon fiber (less unreacted carbon) formed silicon carbide fiber. The failure of the fractional compositions of the various samples to sum to 100 percent is not surprising, but rather falls within the range of experimental error. The analyses indicate the absence of unreacted carbon and of extractable silica in silicon carbide fiber of the invention. The data also show that product of the invention is essentially devoid of whiskers, as none were found in the product. However, use of other discontinuous carbon fiber types resulted in products having numerous whiskers.

Figure 1D:
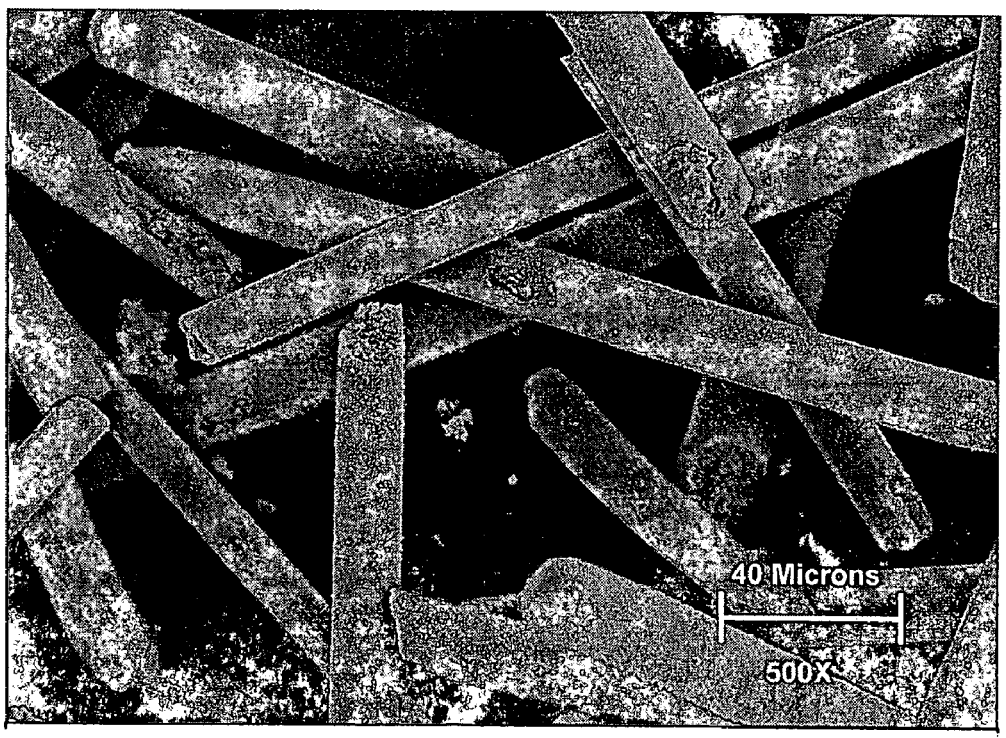
Figure 2:
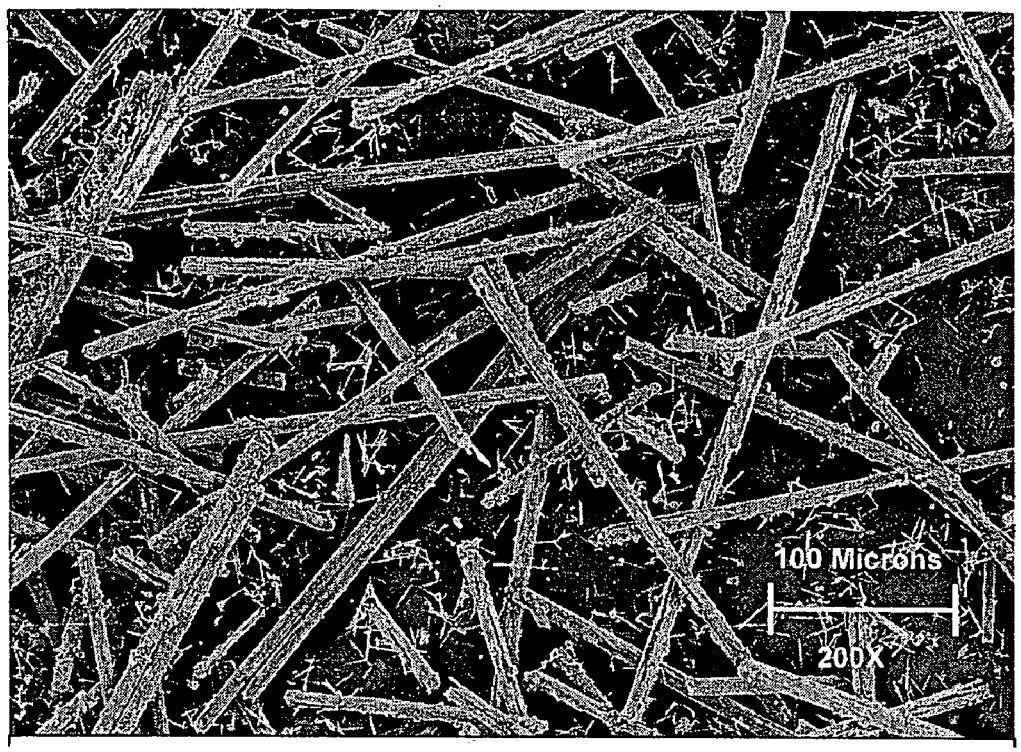
FIG. 2 is an SEM photograph of silicon carbide product prepared from Cytec ThermalGraph® DKD X mesophase pitch-based carbon fiber at 200× magnification.
Figure 3:
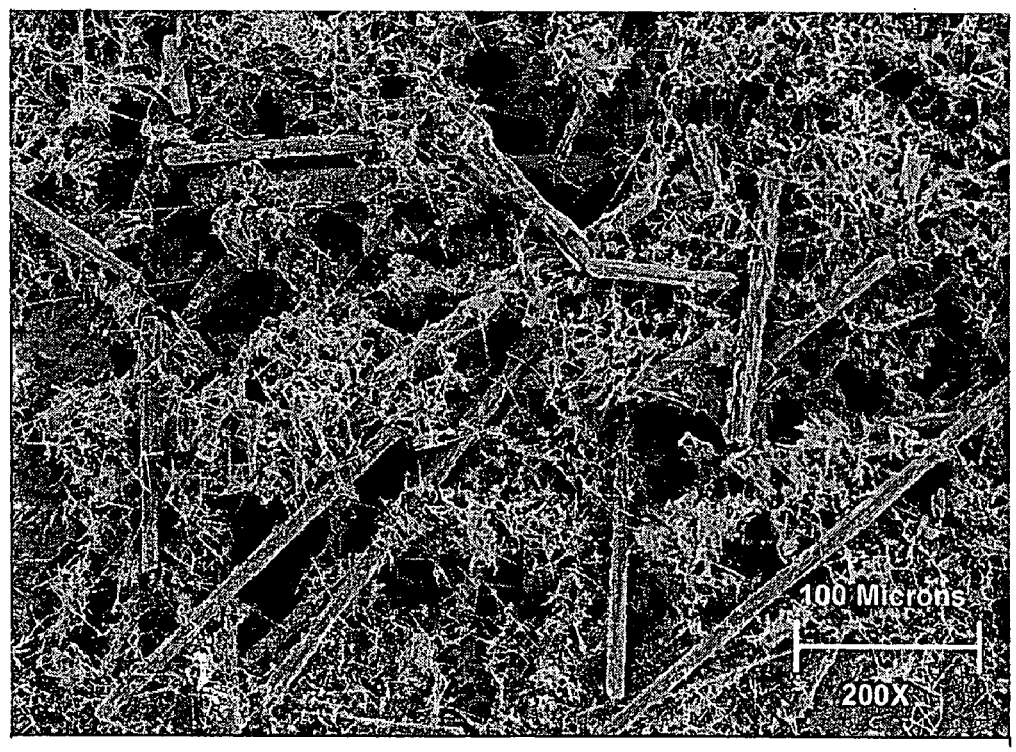
FIG. 3 is an SEM photograph of silicon carbide product prepared from Fortafil® PAN M275 carbon fiber at 200× magnification.

As can be seen from Table 2, the isotropic carbon fiber of the invention yielded silicon carbide fiber product having 96.1 wt % silicon carbide conversion with neither unreacted carbon nor extractable silica. Also, no whiskers are detectable, even at 500× magnification, as can be seen in FIGS. 1b and 1d. In contradistinction, the comparative examples resulted in significant quantities of whiskers, as can be seen in FIGS. 2 and 3. Also, FIGS. 1a–1d highlight the fact that the smoothness of the isotropic carbon fibers is maintained in the resultant silicon carbide fiber product.

Example 2

Figure 4:
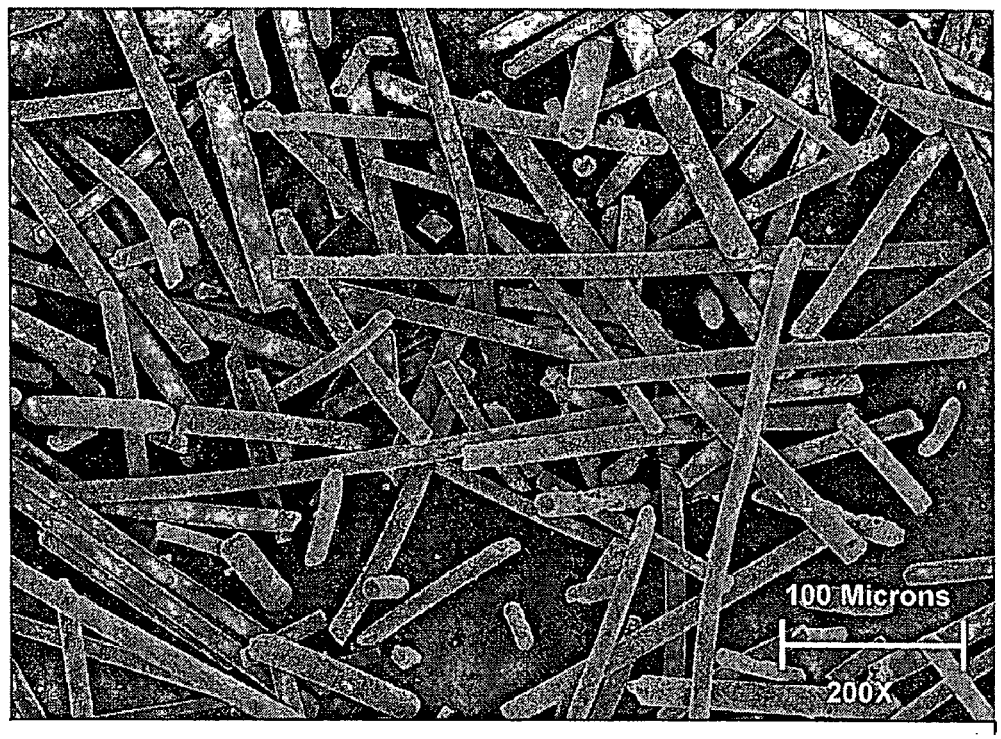
FIG. 4 is an SEM photograph at 200× magnification of silicon carbide fiber of the invention made from P-200 isotropic carbon fiber pretreated 1 hr at 1500° C.
Figure 5:
FIG. 5 is an SEM photograph at 200× magnification of silicon carbide fiber of the invention made from P-200 isotropic carbon fiber pretreated 1 hr at 1800° C.
Figure 6:
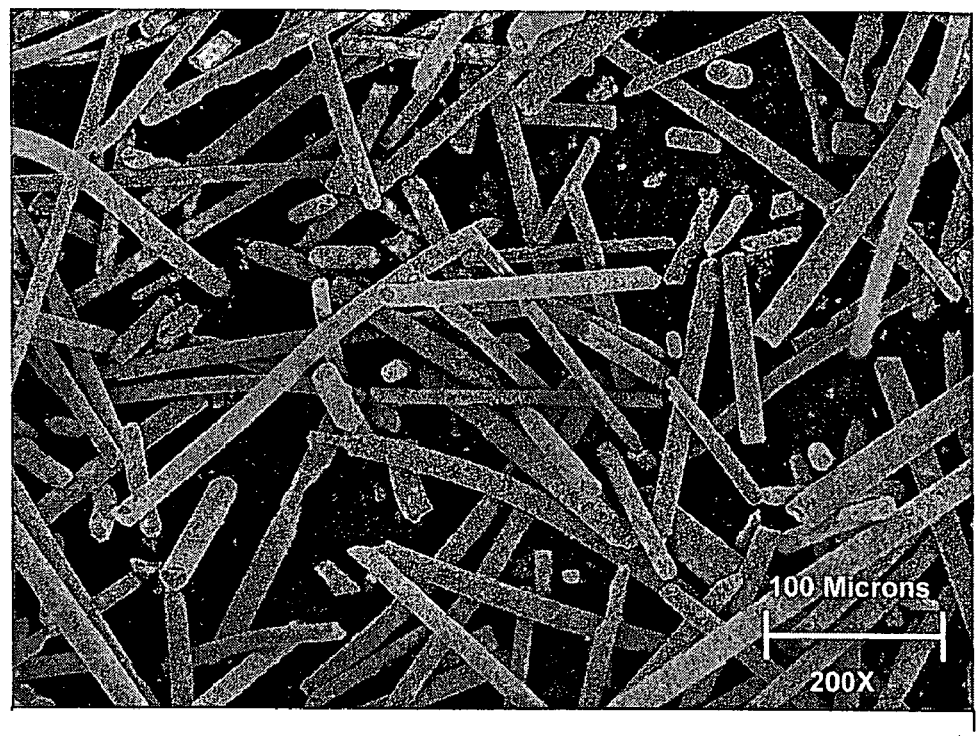
FIG. 6 is an SEM photograph at 200× magnification of silicon carbide fiber of the invention made from P-200 isotropic carbon fiber pretreated 7 hr at 1800° C.
Figure 7:
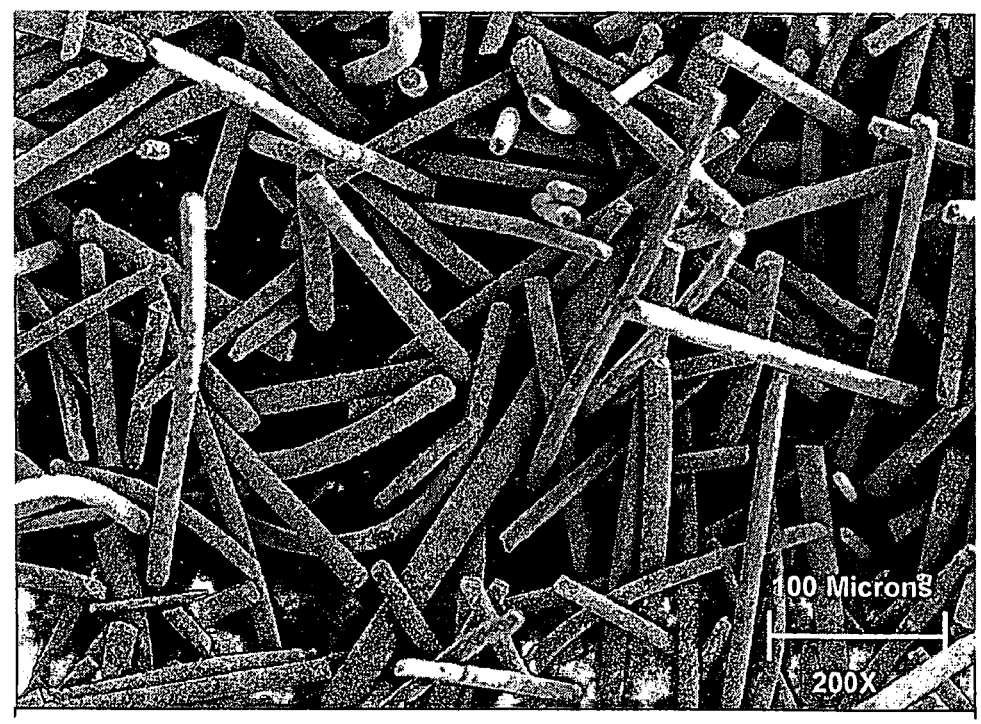
FIG. 7 is an SEM photograph at 200× magnification of silicon carbide fiber of the invention made from a stoichiometric blend of P-200 isotropic carbon fiber and fumed silica.
Figure 8:
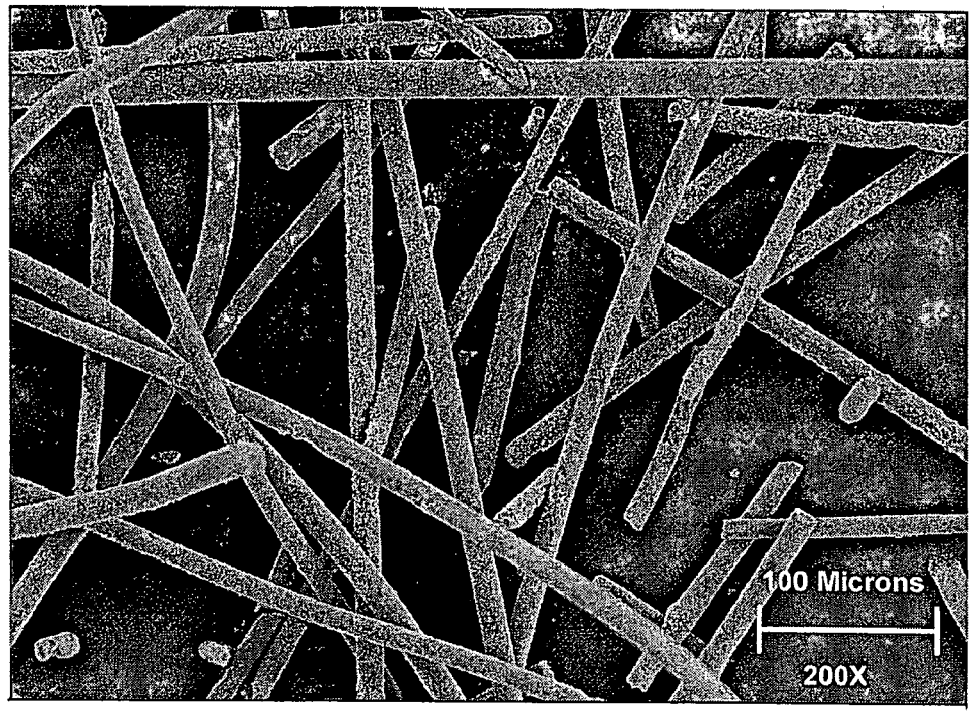
FIG. 8 is an SEM photograph at 200× magnification of silicon carbide fiber of the invention made from Carboflex® P-600 isotropic carbon fiber.

Quantities of Anshan Carboflex® P-200 isotropic carbon fibers were heated under argon for times and at temperatures as set forth in Table 3 below. The treated carbon fibers then were reacted with silica in the laboratory furnace in accordance with the method of Example 1. FIGS. 4, 5 and 6 of samples of the resultant silicon carbide fiber thus produced, show that no whiskers were produced. Indeed, no whiskers were found after thorough examination of each of the product samples.

The following Table 3 summarizes characteristics of the resulting silicon carbide products of the invention:

TABLE 3

| Anshan Carboflex ® Isotropic Carbon Fiber, P-200 | Wt % SiC Conversion | Whiskers | Specific Surface Area, m²/g | Length, microns | Diameter, microns | FIG. |
|---|---|---|---|---|---|---|
| As received | 96.1 | None | 11.2 | 188 | 14.5 | 1b, 1d |
| Pretreated 1 hr at 1500° C. | 96.5 | None | 8.6 | 114 | 11.9 | 4 |
| Pretreated 1 hr at 1800° C. | 95.8 | None | 6.4 | 105 | 12.3 | 5 |
| Pretreated 7 hr at 1800° C. | 97.3 | None | 2.8 | 133 | 11.6 | 6 |

Neither unreacted carbon nor extractable silica was found in any product. The quality of the product fibers was very good, as can be seen from the Figures. The fiber length and diameter of the products of pretreated fibers were somewhat lower than those of the product of the untreated fibers, reflecting the same reductions in the carbon fibers, as set forth in Table 1.

The preheat treatment of the isotropic fibers (Table 1) shows that the carbon fibers are reduced in length and diameter. These analyses, together with the data in Table 3 for the resultant silicon carbide fibers of the invention produced, show that the effect of preheat treating of Carboflex® P-200 carbon fiber was to reduce both the average lengths and diameters, reduce surface areas markedly, and lower the sulfur content of the carbon fiber. During the heat treatment of the fiber, sulfur and sulfurous products were detected in the exhaust gases.

FIGS. 4, 5 and 6 illustrate that the fibers of the invention of Example 2 are essentially devoid of whiskers. The reductions of length and fiber diameter occur mainly during the preheat treatment, rather than during conversion to silicon carbide fiber.

The data also show that surprisingly, the sulfur present in the fiber in concentrations between 0.26 and 1.43 wt % did not inhibit conversion to silicon carbide fiber.

The graphitic structure developed in the precursor due to preheating the isotropic carbon fiber for 7 hours did not generate whiskers in the silicon carbide fiber product of the invention. However, both the mesophase pitch fiber and PAN fiber, both of which have a highly ordered structure, give rise to whiskers when reacted with silica.

Example 3

Silicon carbide fiber of the invention was prepared in accordance with Example 1. However, a stoichiometric ratio of 3.0 moles of carbon to 1.0 mole of silica was used. Carboflex® P-200 isotropic pitch carbon fiber was used.

Data for the silicon carbide product is set forth in Table 4, which also contains data relating to Carboflex® P-200 from Example 1.

TABLE 4

| | Product | | | | | | |
|---|---|---|---|---|---|---|---|
| Blend molar ratio Carbon/Silica | Wt % SiC Conversion | Carbon wt % | Silica, wt % | Surface Area, m²/g | Length, microns | Diameter, microns | FIG. |
| 2.7:1.0 | 96.1 | None | None | 11.2 | 188 | 14.5 | 1b, 1d |
| 3.0:1.0 | 98.4 | 0.2 | None | 12 | 122 | 12.0 | 7 |

The fiber quality of the fibers produced from the 2.7:1 blend of Example 1 was superior to that of those produced from the stoichiometric blend (3:1) of this Example, but both were acceptable. No whiskers were produced in either case. The quality differences are difficult to see by comparing FIGS. 1b and 1d with FIG. 7, but the greater reduction in length and diameter of the product fiber of this Example lends support to this observation.

Example 4

Silicon carbide fiber of the invention was prepared in accordance with Example 1, except that the Carboflex® P-200 of Example 1 was replaced by an equal weight of Carboflex® P-600, a lower sulfur grade of isotropic carbon fiber. The molar ratio of carbon to silica remained 2.7:1.

No whiskers were produced. Table 5 sets forth product characteristics for silicon carbide fiber of this Example, together with comparable data from Examples 1 and 2.

TABLE 5

| Carbon Fiber | | Silicon Carbide Product | | |
|---|---|---|---|---|
| Source, Treatment | Sulfur, wt % | Wt % SiC Conversion | True Density, g/cc | FIG. |
| P-200, as received | 1.43 | 96.1 | 3.19 | 1b, 1d |
| Pretreated 1 hr at 1500° C. | 0.85 | 96.5 | 3.18 | 4 |
| Pretreated 1 hr at 1800° C. | 0.26 | 95.8 | 3.20 | 5 |
| Pretreated 7 hr at 1800° C. | 0.36 | 97.3 | 3.20 | 6 |
| P-600, as received | 0.59 | 99.3 | 3.20 | 8 |

Table 5 suggests that the effect of sulfur content on the production of silicon carbide fiber produced was minimal. It is surprising that the sulfur is not detrimental to the conversion to silicon carbide. Further, the presence of sulfur in the carbon fiber did not reduce the quality of the fibers.

Example 5

Silicon carbide fiber of the invention was prepared with each type of promoter individually, and without any promoters. The fibers were prepared in accordance with the method of Example 1.

Data on the composition and unreacted carbon for each of the fibers made using only one or no promoter is set forth in Table 6 below. For comparison, the same information of product of Example 2 made using both promoters also is set forth in Table 6.

TABLE 6

| Starting Materials | | | | | |
|---|---|---|---|---|---|
| 2.7 moles C per 1 mole of SiO$_2$ | 1.5 wt % FeSO$_4$ | 0.6 wt % CaC$_2$O$_4$ | Product | | |
| | | | Wt % SiC Conversion | Carbon, Wt % | FIG. |
| X | X | X | 96.1 | None Detected | 4 |
| X | X |   | 99.2 | 0.8 | 9 |
| X |   | X | 92.0 | 0.5 | 10 |
| X |   |   | 97.3 | None Detected | 11a, 11b |

No whiskers were observed in any of the product samples, as can be seen in the Figures. This result is surprising, as the skilled practitioner would have expected the presence of promoters to have produced whiskers. Both iron and calcium salts are reported to be whisker promoters.

The Figures illustrate the degraded quality of the fibers. Crystalline structure and granularity of the silicon carbide fiber of the invention are seen most clearly in FIGS. 11a and 11b. Such degraded fiber material may have different commercial uses from the uses of non-degraded fiber.

Thus it can be seen that the presence of both types of promoters greatly increases fiber quality. Silicon carbide fiber of the invention produced in accordance with a preferred embodiment, in which two promoters are present, essentially retains the morphology of the isotropic carbon fiber used. Although both the diameter and length of product fibers typically have reduced slightly, as illustrated in these Examples, the resultant silicon carbide fiber is a smooth-surfaced cylinder sharing dimensions similar to the dimensions of the carbon fiber starting material.

Example 6

Silicon carbide fiber of the invention having a length of 25 mm was made in accordance with the method of Example 1, with the exception that preparation times were extended to ensure that the long fibers were thoroughly covered with promoters and thoroughly admixed with the silica. Anshan Carboflex® C-25 fibers were substituted for the Carboflex® P-200. The "opening" of the fibers was extended from one minute to eight minutes. Blending of the fibers plus promoters was for 5 minutes. Final mixing with the silica was for an additional ten minutes. Silicon carbide fibers of the invention approximately 25 mm long were made and were devoid of whiskers.

Example 7

Silicon carbide fibers of the invention having a length of 6 mm were dispersed in water and a wet-laid furnish created. The furnish was cast on Whatman Filter Paper No. 4 as the forming surface and a non-woven web was formed. The basis weight of the web was 417 g/m$^2$. After drying the web at 100–150° C. for a time significant to remove the water and form a bone dry substrate, the substrate was treated with Rohm & Haas GL-618 self-crosslinking acrylic emulsion, which acts as a polymeric binder. Binder was applied at a rate of 2 wt percent based on solids. Final curing of the fibrous web and binder was at 200° C. for 30 minutes. The resulting non-woven article is suitable for use as filter media, gasket material, and other products, and was devoid of whiskers.

Example 8

Figure 13:
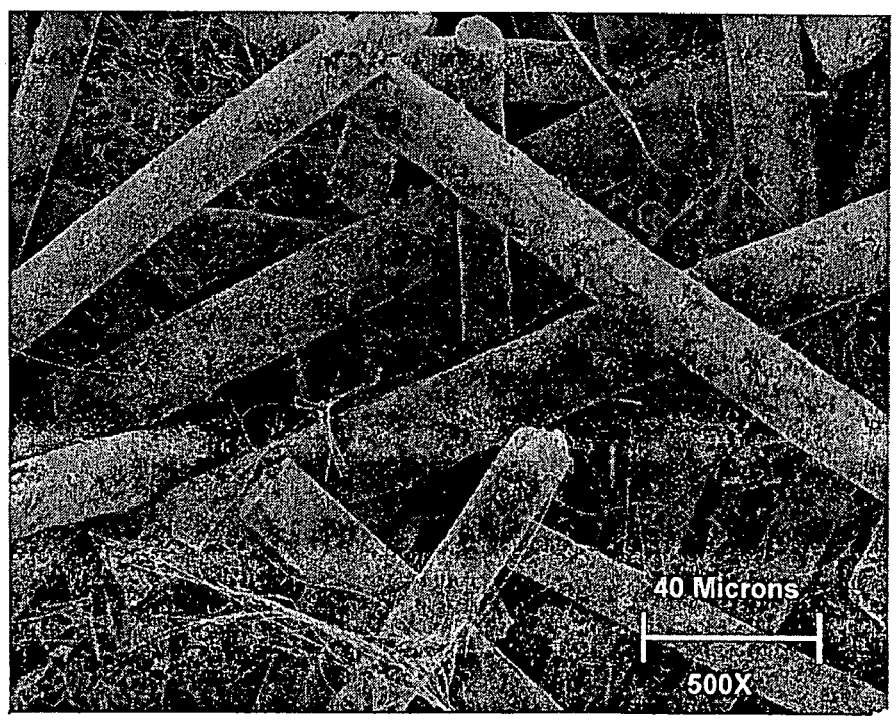
FIG. 13 is an SEM photograph at 500× magnification of silicon carbide fiber made under a nitrogen atmosphere.

Silicon carbide fiber was prepared in accordance with the method of Example 1, except that the atmosphere was nitrogen rather than argon. FIG. 13 is an SEM photograph at 200× magnification of the silicon carbide fiber thus produced. A significant quantity of whiskers can be seen in the photograph. Comparison of FIG. 13 with FIG. 1b illustrates the whisker-laden nature of fiber produced under nitrogen with the whisker-fee nature of silicon carbide fiber of the invention prepared under argon.

Example 9

To illustrate the number of whiskers present in prior art products, samples were prepared at various whisker contents between 0.1 and 1.0 wt percent by adding commercial whiskers to a product that had 0.1 wt percent, whiskers as produced. Silicon carbide fiber having 0.1 wt percent whiskers was produced in accordance with the method of U.S. Pat. No. 6,767,523. This product then was used to form samples having 0.2, 0.6, and 1.0 wt percent whiskers by adding the appropriate quantity of whiskers. The whiskers were dispersed in the silicon carbide fiber product by ultrasonic dispersion in denatured alcohol, dried, and then re-dispersed in transparent microscopy immersion oil.

Photomicrographs and SEM photographs clearly illustrated the number of whiskers. However, the total number of whiskers could not be visualized clearly because of depth-of-field limitations. Photomicrographs at 200× magnification and SEM photographs at 300× magnification were obtained, as set forth in the following table:

TABLE 7

| Whisker content, wt percent | 0.1 | 0.2 | 0.6 | 1.0 |
|---|---|---|---|---|
| Photomicrograph, FIG. 14 | a | b | c | d |
| SEM Photograph, FIG. 15 | a | b | c | d |

The photomicrographs each clearly showed more than 1 whisker, even when few fibers are in the view. At 0.6 and 1.0 wt percent whiskers, the number of whiskers clearly exceeded the number of fibers. The SEM photographs more clearly illustrated the number of whiskers present, even at the 0.1 wt percent whisker content. These photographs also illustrated that silicon carbide fiber from carbonized cotton fibers were not smooth, but rather were twisted, misshapen, often showed significant texture, and had many frayed edges and asperities. Each of these factors may lead to nucleation and growth of whiskers.

Example 10

The oxygen and nitrogen concentrations of products of the invention were determined and compared. Silicon carbide fiber was prepared in accordance with the method of U.S. Pat. No. 6,767,523 and was analyzed for nitrogen and oxygen by inert gas fusion on a Horiba EMGA 620W. Silicon carbide fiber of the invention of Example 6 also was analyzed in the same way. U.S. Pat. No. 5,618,510 discloses the nitrogen and oxygen contents of silicon carbide fiber prepared in accordance with the method disclosed therein.

The following table summarizes the data obtained:

TABLE 8

| | Wt percent Nitrogen | Wt percent Oxygen |
|---|---|---|
| Nixdorf, U.S. Pat. No. 6,767,523 | 1.4 | 2.0 |
| Okada, U.S. Pat. No. 5,618,510 | 2.0 | 1.0 |
| Example 6 of the invention | 0.31 | 0.70 |

The table shows that the oxygen and nitrogen contents of silicon carbide fiber of the invention are significantly lower than those of the prior art.

Example 11

The apparent densities of carbon fibers and silicon carbide fiber products made therefrom in accordance with the method of the invention (Example 1) and of U.S. Pat. No. 6,767,523, respectively, and of the activated carbon fiber used in Nakajima, U.S. Pat. No. 5,922,300; were determined by mercury intrusion porosimetry. The apparent density of silicon carbide fiber of Nakajima, U.S. Pat. No. 5,922,300 was calculated.

The following table summarizes the results of the determinations:

TABLE 9

| | Apparent density, Carbon fiber, g/cc | Apparent density, Silicon carbide fiber, g/cc |
|---|---|---|
| Nixdorf, U.S. Pat. No. 6,767,523 | 1.14 | 1.02 |
| Nakajima, U.S. Pat. No. 5,922,300 | 0.90 | 1.17 |
| Example 1 of this invention | 1.35 | 1.83 |

The apparent density of Nakajima silicon carbide fiber was not determined because no sample was available; the value in Table 9 was calculated, based on the measured apparent density of the carbon fiber. Although the inventors do not wish to be bound by theory, it is believed that the open and frangible structure of the porous carbon fiber of Nakajima acts in the same way as the porous carbonized cotton fiber of U.S. Pat. No. 6,767,523. Further, even the products of Nakajima that are densified have the same morphology as the starting carbon fiber, and are densified only on the surfaces. Therefore, the apparent density of Nakajima's silicon carbide fiber product would be expected not to increase by an amount greater than the increase in the example, or less than or about 0.30 g/cc.

Any source of fine silica can be used in the claimed invention. Furthermore, the method of the claimed invention results in essentially no whiskers and β-silicon carbide fiber of high quality and gray-green color when using promoters. Fiber quality is degraded if only one or no promoters are used, but the resultant silicon carbide fiber of the invention is essentially devoid of whiskers. The conversion of carbon fiber to silicon carbide fiber does not significantly change the morphology when using two promoters. The degradation in fiber quality experienced in the absence of both promoters changes the morphology, as shown in FIGS. 9, 10, 11*a*, and 11*b*.

We claim:

1. Discontinuous silicon carbide fiber essentially devoid of whiskers, essentially devoid of boron, and having less than about 1.25 wt percent nitrogen and an apparent density of greater than about 1.65 g/cc.

2. Silicon carbide fiber of claim 1, wherein the silicon carbide fiber has less than about 1.1 wt percent nitrogen.

3. Silicon carbide fiber of claim 2, wherein the silicon carbide fiber has less than about 0.9 wt percent nitrogen.

4. Silicon carbide fiber of claim 1, wherein the silicon carbide fiber has an apparent density of at least about 1.85 g/cc.

5. Silicon carbide fiber of claim 4, wherein the silicon carbide fiber has an apparent density of at least about 2.0 g/cc.

6. Silicon carbide fiber of claim 5, wherein the silicon carbide fiber has an apparent density of at least about 2.2 g/cc.

7. Silicon carbide fiber of claim 2, wherein the silicon carbide fiber has an apparent density of at least about 1.85 g/cc.

8. Silicon carbide fiber of claim 7, wherein the silicon carbide fiber has an apparent density of at least about 2.0 g/cc.

9. Silicon carbide fiber of claim 8, wherein the silicon carbide fiber has an apparent density of at least about 2.2 g/cc.

10. Silicon carbide fiber of claim 3, wherein the silicon carbide fiber has an apparent density of at least about 1.85 g/cc.

11. Silicon carbide fiber of claim 10, wherein the silicon carbide fiber has an apparent density of at least about 2.0 g/cc.

12. Silicon carbide fiber of claim 10, wherein the silicon carbide fiber has an apparent density of at least about 2.2 g/cc.

13. Silicon carbide fiber of claim 4, wherein the silicon carbide fiber has less than about 0.9 wt percent oxygen.

14. Silicon carbide fiber of claim 7, wherein the silicon carbide fiber has less than about 0.9 wt percent oxygen.

15. Silicon carbide fiber of claim 10, wherein the silicon carbide fiber has less than about 0.9 wt percent oxygen.

16. Silicon carbide fiber of claim 12, wherein the silicon carbide fiber has less than about 0.9 wt percent oxygen.

17. Silicon carbide fiber of claim 1 wherein the silicon carbide fiber has a true density of at least 3.0 g/cc.

18. A regenerable medium for filtering combustible carbonaceous compounds from fluids comprising silicon carbide fiber of claim 1.

19. A fibrous web comprising silicon carbide fiber of claim 1.

20. The web of claim 19, wherein the web is non-woven.

21. The web of claim 20, wherein the web is wet laid.

* * * * *